US012138752B2

(12) United States Patent
Aoki et al.

(10) Patent No.: US 12,138,752 B2
(45) Date of Patent: Nov. 12, 2024

(54) IMPACT TOOL

(71) Applicant: MAKITA CORPORATION, Anjo (JP)

(72) Inventors: Kazuma Aoki, Anjo (JP); Tomoro Aoyama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/139,763

(22) Filed: Apr. 26, 2023

(65) Prior Publication Data

US 2023/0398662 A1 Dec. 14, 2023

(30) Foreign Application Priority Data

Jun. 13, 2022 (JP) ................................ 2022-094812

(51) Int. Cl.
*B25B 21/02* (2006.01)

(52) U.S. Cl.
CPC .................................... *B25B 21/02* (2013.01)

(58) Field of Classification Search
CPC ..... B25B 21/02; B25B 21/026; B25B 21/023; B25B 23/0007; B25B 23/1405; B25B 23/1475; B25B 23/147; B25D 17/06
See application file for complete search history.

(56) References Cited

U.S. PATENT DOCUMENTS

| | | | | |
|---|---|---|---|---|
| 11,389,933 | B2 * | 7/2022 | Chellew | B25B 21/026 |
| 2014/0338942 | A1 * | 11/2014 | Putney | B25B 21/026 173/205 |
| 2020/0198100 | A1 * | 6/2020 | Schneider | B25B 23/16 |
| 2020/0215668 | A1 * | 7/2020 | Duncan | B25B 23/0007 |
| 2021/0060755 | A1 * | 3/2021 | Kawai | B25F 5/00 |
| 2021/0094158 | A1 * | 4/2021 | Kato | B25B 23/147 |
| 2021/0339361 | A1 * | 11/2021 | Abbott | B25B 21/02 |
| 2022/0193877 | A1 * | 6/2022 | Samstag | B25F 5/02 |
| 2022/0212320 | A1 * | 7/2022 | Kawai | B25B 21/026 |
| 2023/0202004 | A1 * | 6/2023 | Tamura | B25B 21/02 173/93 |

FOREIGN PATENT DOCUMENTS

CN 205651274 U 10/2016

* cited by examiner

*Primary Examiner* — Dariush Seif
(74) *Attorney, Agent, or Firm* — Oliff PLC

(57) ABSTRACT

To improve operability it is desireable to decrease the size of an impact tool. The impact tool includes a motor, a spindle including a spindle shaft and a flange. An anvil of the tool includes an anvil shaft and an anvil projection. A hammer of the tool includes a base surrounding the spindle shaft, a front ring protruding frontward from an outer circumference of the base, and a hammer projection to strike the anvil projection in a rotation direction. The base has a groove at a boundary with the hammer projection. One of ordinary skill in the art would appreciate that the arrangement disclosed herein results in space savings that allows for overall decrease in the size of an impact too.

14 Claims, 17 Drawing Sheets

IMPACT TOOL

CROSS-REFERENCE TO RELATED APPLICATIONS

This application claims the benefit of priority to Japanese Patent Application No. 2022-094812, filed on Jun. 13, 2022, the entire contents of which are hereby incorporated by reference.

BACKGROUND

1. Technical Field

The present disclosure relates to an impact tool.

2. Description of the Background

In the field of impact tools, a known impact assembly is described in Chinese Utility Application Publication No. 205651274.

BRIEF SUMMARY

For improved operability of an impact tool, a technique is awaited for an impact tool with less size increase.

One or more aspects of the present disclosure are directed to an impact tool with less size increase.

A first aspect of the present disclosure provides an impact tool, including:

- a motor;
- a spindle rotatable with a rotational force from the motor, the spindle including
  - a spindle shaft, and
  - a flange on a rear portion of the spindle shaft;
- an anvil located frontward from the spindle, the anvil including
  - an anvil shaft to receive a tip tool, and
  - an anvil projection protruding radially outward from the anvil shaft; and
- a hammer including
  - a base surrounding the spindle shaft,
  - a front ring protruding frontward from an outer circumference of the base, and
  - a hammer projection protruding radially inward from an inner circumferential surface of the front ring to strike the anvil projection in a rotation direction, the hammer projection having a front surface located frontward from a front surface of the base,
- wherein the base has a groove at a boundary with the hammer projection.

The impact tool according to the above aspect of the present disclosure has less size increase.

DETAILED DESCRIPTION

One or more embodiments will now be described with reference to the drawings. In the embodiments, the positional relationships between the components will be described using the directional terms such as right and left (or lateral), front and rear (or frontward and rearward), and up and down. The terms indicate relative positions or directions with respect to the center of an impact tool 1. The impact tool 1 includes a motor 6 as a power source.

In the embodiments, a direction parallel to a rotation axis AX of the motor 6 is referred to as an axial direction, a direction about the rotation axis AX of the motor 6 is referred to as a circumferential direction, circumferentially, or a rotation direction, and a direction radial from the rotation axis AX is referred to as a radial direction or radially for convenience.

The rotation axis AX extends in a front-rear direction. The axial direction is from the front to the rear or from the rear to the front. A position nearer the rotation axis AX in the radial direction, or a radial direction toward the rotation axis AX, is referred to as radially inside or radially inward for convenience. A position farther from the rotation axis AX in the radial direction, or a radial direction away from the rotation axis AX, is referred to as radially outside or radially outward for convenience.

First Embodiment

A first embodiment will now be described.

Impact Tool

Figure 1:
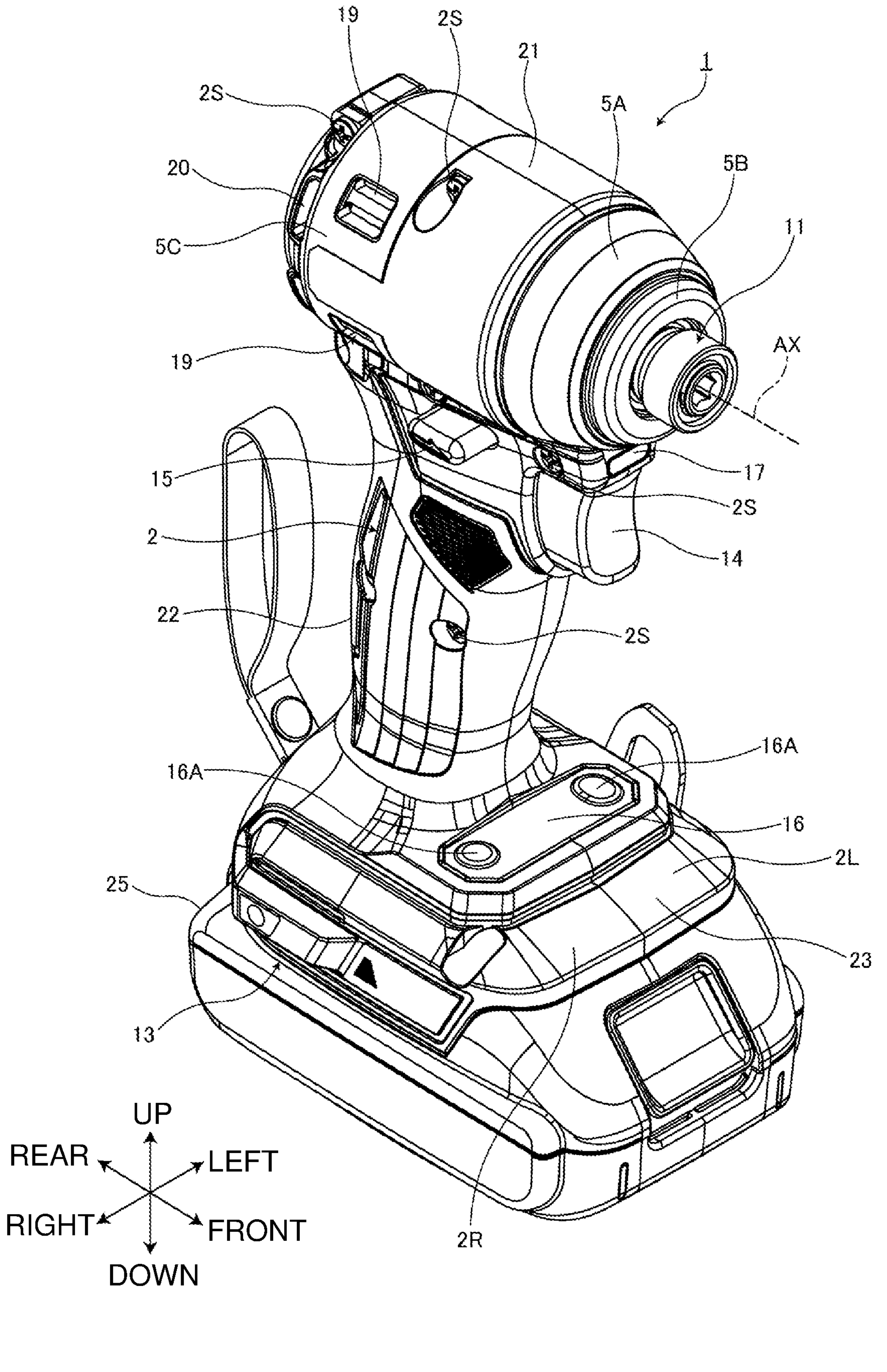
FIG. 1 is a perspective view of an impact tool according to a first embodiment as viewed from the front.
Figure 2:
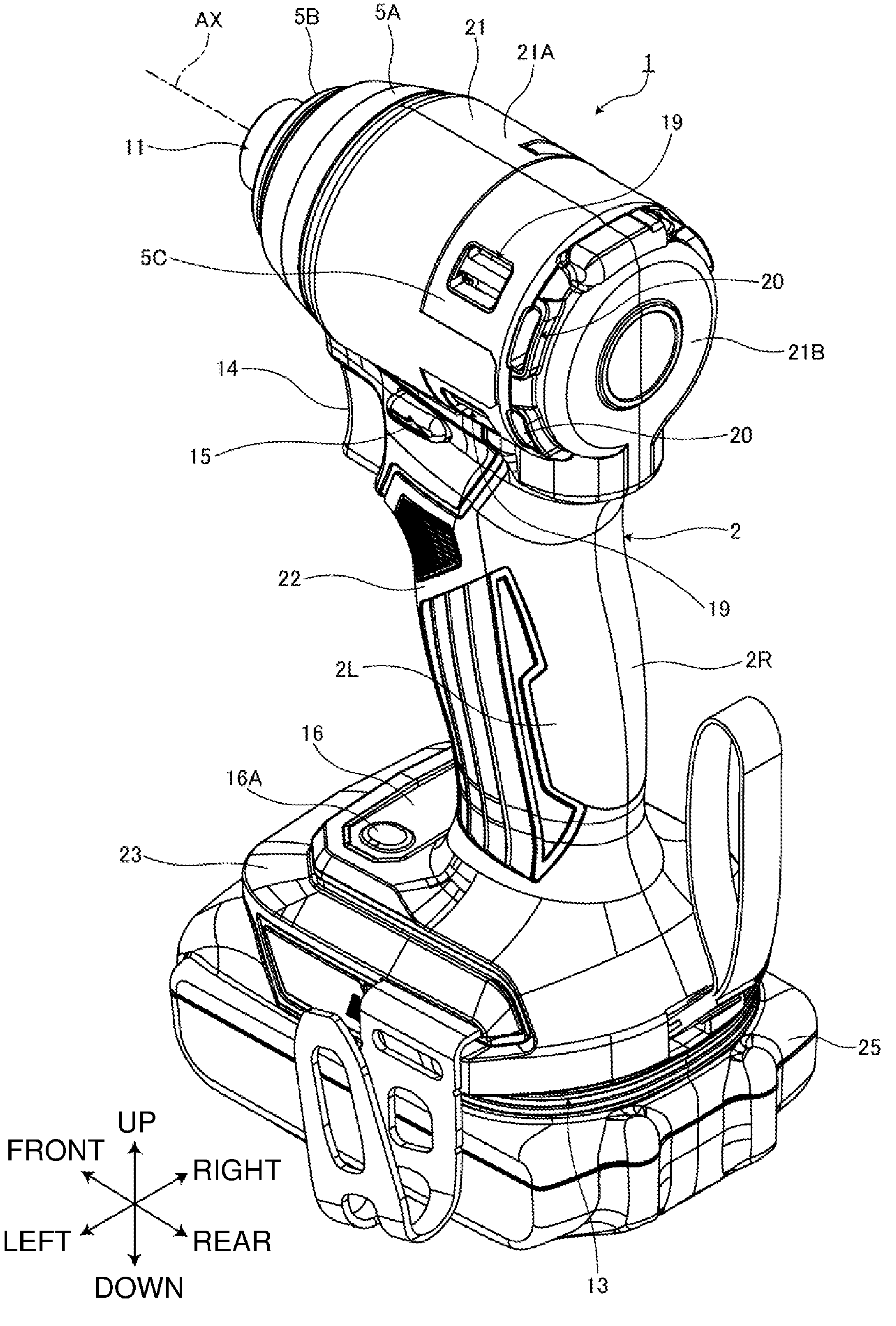
FIG. 2 is a perspective view of the impact tool according to the first embodiment as viewed from the rear.
Figure 3:
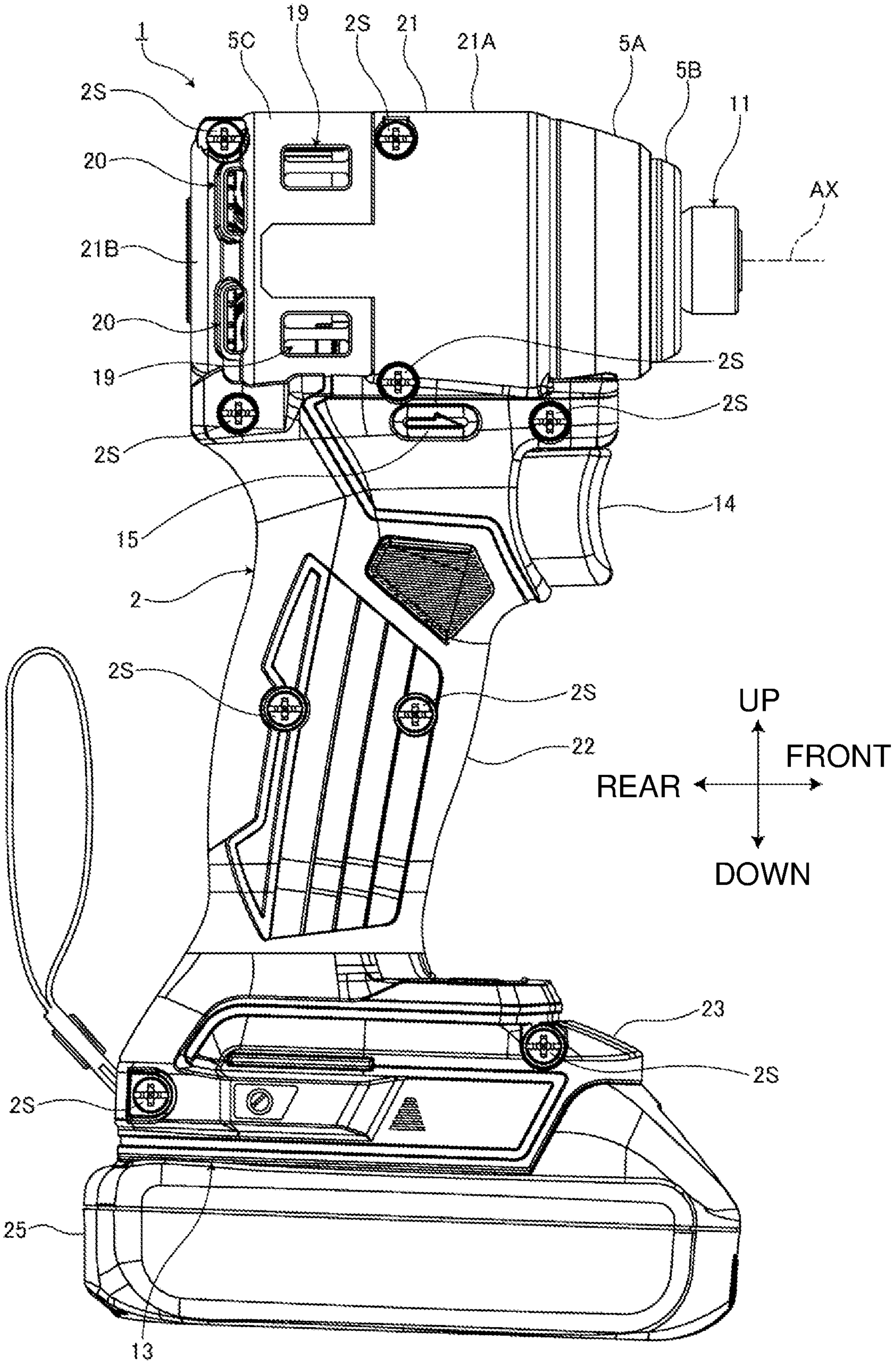
FIG. 3 is a side view of the impact tool according to the first embodiment.
Figure 4:
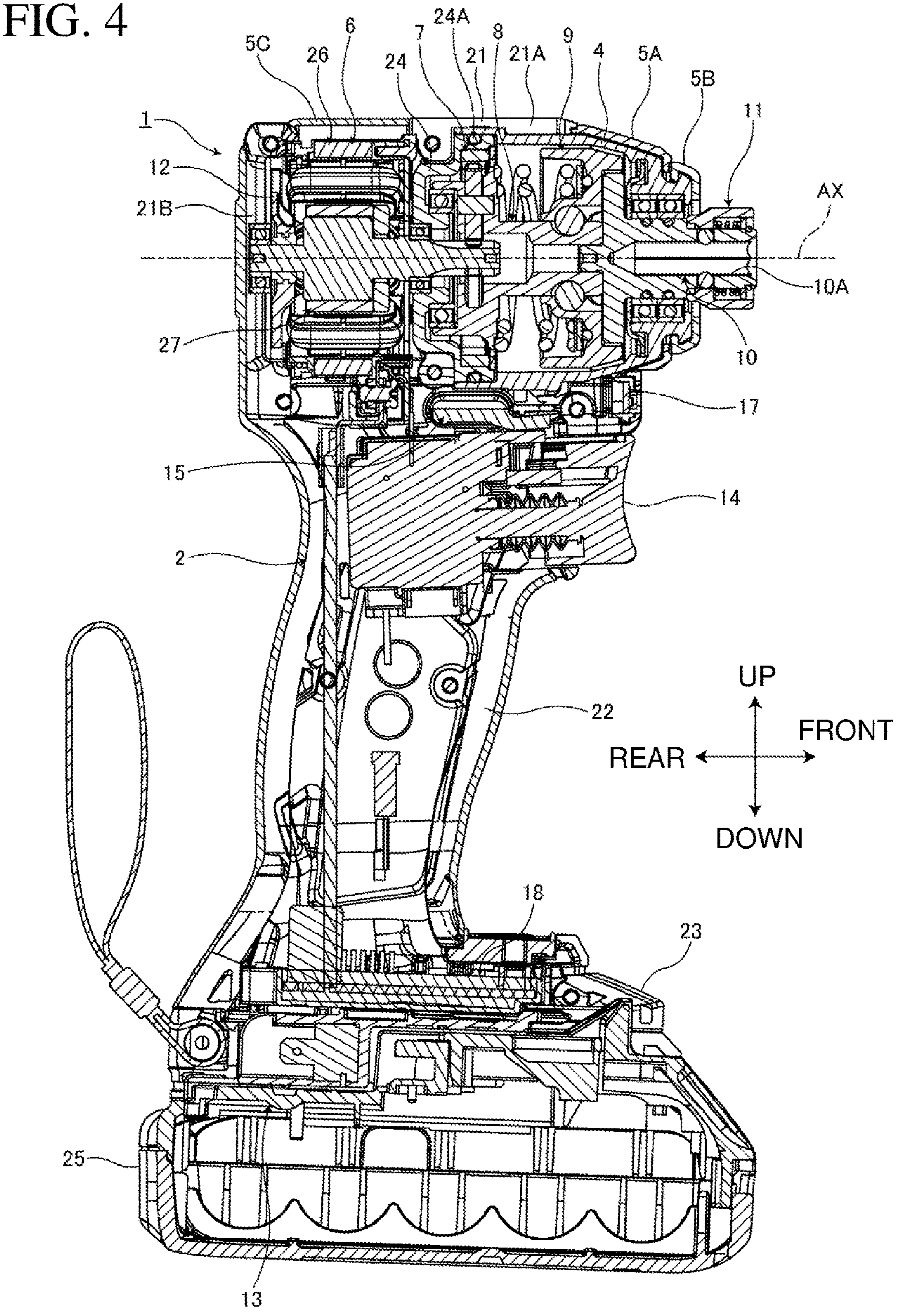
FIG. 4 is a longitudinal sectional view of the impact tool according to the first embodiment.

FIG. 1 is a perspective view of the impact tool 1 according to the present embodiment as viewed from the front. FIG. 2 is a perspective view of the impact tool 1 as viewed from the rear. FIG. 3 is a side view of the impact tool 1. FIG. 4 is a longitudinal sectional view of the impact tool 1.

The impact tool 1 according to the present embodiment is an impact driver that is a screwing machine. The impact tool 1 includes a housing 2, a hammer case 4, a hammer case cover 5A, a bumper 5B, a housing cover 5C, the motor 6, a reducer 7, a spindle 8, a striker 9, an anvil 10, a tool holder 11, a fan 12, a battery mount 13, a trigger lever 14, a forward-reverse switch lever 15, an operation display 16, a light 17, and a controller 18.

The housing 2 is formed from a synthetic resin. The housing 2 in the present embodiment is formed from nylon. The housing 2 includes a left housing 2L and a right housing 2R. The right housing 2R is located on the right of the left housing 2L. The left and right housings 2L and 2R are fastened together with multiple screws 2S. The housing 2 includes a pair of housing halves.

The housing 2 includes a motor compartment 21, a grip 22, and a battery holder 23.

The motor compartment 21 accommodates the motor 6. The motor compartment 21 includes a cylindrical portion 21A and a rear plate 21B. The rear plate 21B is integrally connected to the rear end of the cylindrical portion 21A. The motor compartment 21 accommodates at least a part of the hammer case 4.

The grip 22 is grippable by an operator. The grip 22 extends downward from the motor compartment 21. The trigger lever 14 is located in an upper portion of the grip 22.

The battery holder 23 holds a battery pack 25 with the battery mount 13. The battery holder 23 is connected to the lower end of the grip 22. The battery holder 23 has larger outer dimensions than the grip 22 in the front-rear direction and in the lateral direction.

The motor compartment 21 has inlets 19 and outlets 20. The outlets 20 are located rearward from the inlets 19. Air outside the housing 2 flows into an internal space of the housing 2 through the inlets 19, and then flows out of the housing 2 through the outlets 20.

The hammer case 4 accommodates the reducer 7, the spindle 8, the striker 9, and at least a part of the anvil 10. The reducer 7 is located at least partially inside a bearing box 24. The reducer 7 includes multiple gears.

The hammer case 4 is formed from a metal. The hammer case 4 in the present embodiment is formed from aluminum. The hammer case 4 is cylindrical. The hammer case 4 connects to a front portion of the motor compartment 21. The bearing box 24 is fixed to a rear portion of the hammer case 4. The bearing box 24 has a cylindrical outer surface on its outer periphery. The hammer case 4 has a cylindrical inner surface on its inner periphery. The bearing box 24 is fitted into the rear portion of the hammer case 4 with an O-ring 24A in between. The cylindrical outer surface of the bearing box 24 and the cylindrical inner surface of the hammer case 4 are connected with the O-ring 24A to fix the bearing box 24 and the hammer case 4 together. The hammer case 4 is held between the left housing 2L and the right housing 2R. The hammer case 4 is at least partially accommodated in the motor compartment 21. The bearing box 24 is fixed to the motor compartment 21 and the hammer case 4.

The hammer case cover 5A covers at least a part of the surface of the hammer case 4. The bumper 5B is attached to the front end of the hammer case 4. The hammer case cover 5A and the bumper 5B protect the hammer case 4. The hammer case cover 5A and the bumper 5B prevent contact between the hammer case 4 and objects nearby. The housing cover 5C covers at least a part of the surface of the housing 2.

The motor 6 is a power source for the impact tool 1. The motor 6 is an inner-rotor brushless motor. The motor 6 includes a stator 26 and a rotor 27. The stator 26 is supported on the motor compartment 21. The rotor 27 is located at least partially inward from the stator 26. The rotor 27 rotates relative to the stator 26. The rotor 27 rotates about the rotation axis AX extending in the front-rear direction.

The reducer 7 connects the rotor 27 and the spindle 8 together. The reducer 7 transmits rotation of the rotor 27 to the spindle 8. The reducer 7 rotates the spindle 8 at a lower rotational speed than the rotor 27. The reducer 7 is located frontward from the motor 6. The reducer 7 includes a planetary gear assembly. The reducer 7 includes the multiple gears. The rotor 27 drives the gears in the reducer 7.

The spindle 8 rotates with a rotational force from the rotor 27 transmitted by the reducer 7. The spindle 8 is located frontward from at least a part of the motor 6. The spindle 8 is located frontward from the stator 26. The spindle 8 is located at least partially frontward from the rotor 27. The spindle 8 is located at least partially in front of the reducer 7. The spindle 8 is located behind the anvil 10.

The striker 9 strikes the anvil 10 in the rotation direction in response to a rotational force of the spindle 8 rotated by the motor 6. A rotational force from the motor 6 is transmitted to the striker 9 through the reducer 7 and the spindle 8.

The anvil 10 is an output shaft of the impact tool 1 that rotates in response to a rotational force of the rotor 27. The anvil 10 is located frontward from the motor 6. The anvil 10 has a tool hole 10A. The tool hole 10A receives a tip tool. The anvil 10 has the tool hole 10A at its front end. The tip tool is attached to the anvil 10.

The tool holder 11 holds the tip tool received in the tool hole 10A. The tool holder 11 surrounds a front portion of the anvil 10. The tip tool is attachable to and detachable from the tool holder 11.

The fan 12 generates an airflow for cooling the motor 6. The fan 12 is located rearward from the stator 26. The fan 12 is fastened to at least a part of the rotor 27. As the fan 12 rotates, air outside the housing 2 flows into the internal space of the housing 2 through the inlets 19 and flows through the internal space of the housing 2 to cool the motor 6. As the fan 12 rotates, the air passing through the housing 2 flows out of the housing 2 through the outlets 20.

The battery mount 13 is connected to the battery pack 25. The battery pack 25 is attached to the battery mount 13 in a detachable manner. The battery mount 13 is located in a lower portion of the battery holder 23. The battery pack 25 is placed onto the battery mount 13 from the front of the battery holder 23 and is thus attached to the battery mount 13. The battery pack 25 is pulled forward along the battery mount 13 and is thus detached from the battery mount 13. The battery pack 25 includes a secondary battery. The battery pack 25 in the embodiment includes a rechargeable lithium-ion battery. The battery pack 25 is attached to the battery mount 13 to power the impact tool 1. The motor 6 is driven by power supplied from the battery pack 25.

The trigger lever 14 is operable by the operator to activate the motor 6. The trigger lever 14 is operable to switch the motor 6 between the driving state and the stopped state. The trigger lever 14 is located on the grip 22.

The forward-reverse switch lever 15 is operable by the operator. The forward-reverse switch lever 15 is operable to switch the rotation direction of the motor 6 between forward and reverse. This operation switches the rotation direction of the spindle 8. The forward-reverse switch lever 15 is located above the grip 22.

The operation display 16 includes multiple operation buttons 16A. The operation buttons 16A are operable by the operator to change the operational mode of the motor 6. The operation display 16 is located on the battery holder 23. The operation display 16 is located on the upper surface of the battery holder 23 frontward from the grip 22.

The light 17 emits illumination light. The light 17 illuminates the anvil 10 and an area around the anvil 10 with illumination light. The light 17 illuminates an area ahead of the anvil 10 with illumination light. The light 17 also illuminates the tip tool attached to the anvil 10 and an area around the tip tool with illumination light. The light 17 is located above the trigger lever 14.

The controller 18 outputs control signals for controlling the motor 6. The controller 18 includes a board on which multiple electronic components are mounted. Examples of the electronic components mounted on the board include a processor such as a central processing unit (CPU), a non-volatile memory such as a read-only memory (ROM) or a storage device, a volatile memory such as a random-access memory (RAM), a transistor, and a resistor. The controller 18 is accommodated in the battery holder 23.

Figure 5:
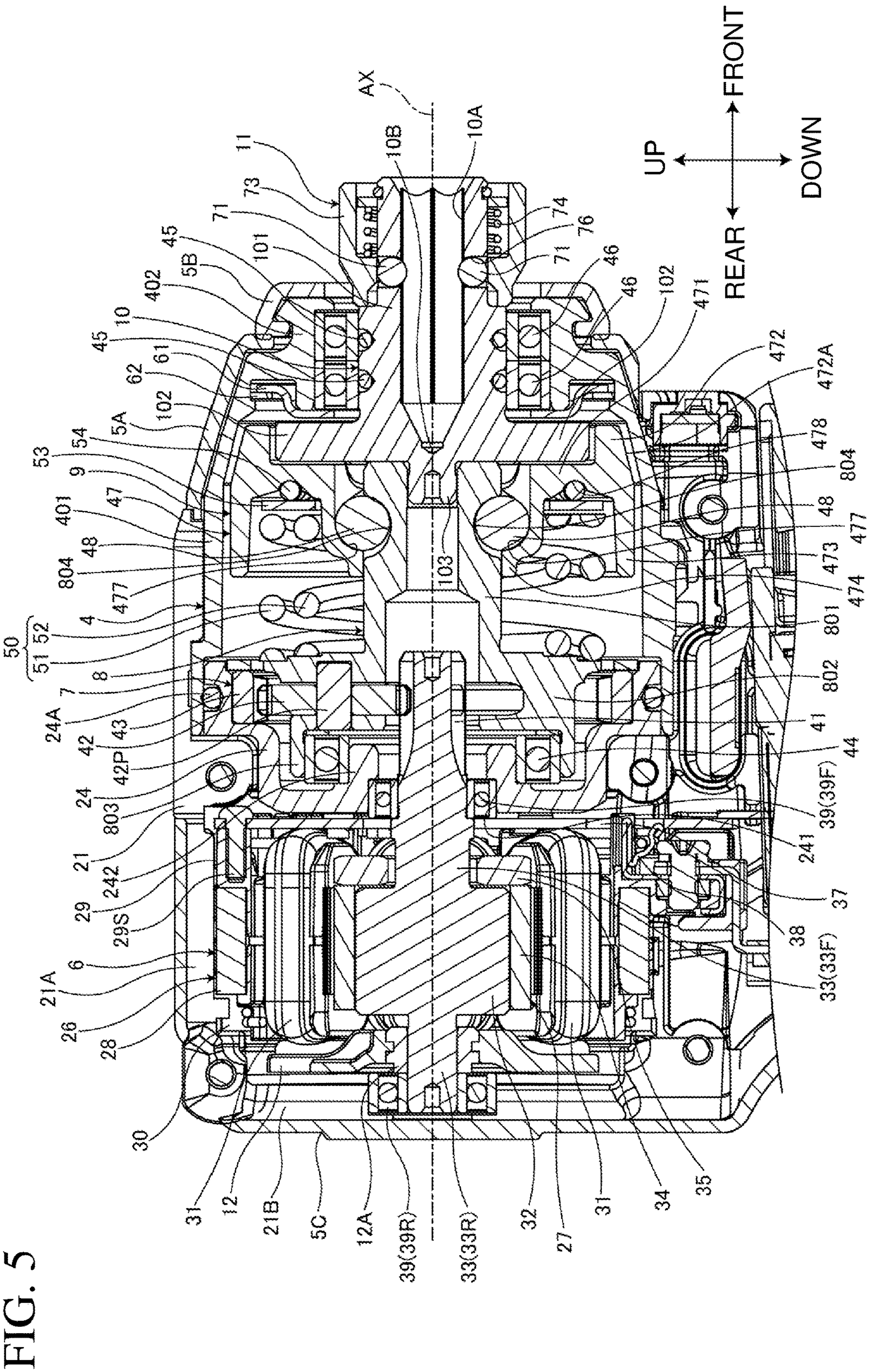
FIG. 5 is a longitudinal sectional view of an upper portion of the impact tool according to the first embodiment.
Figure 6:
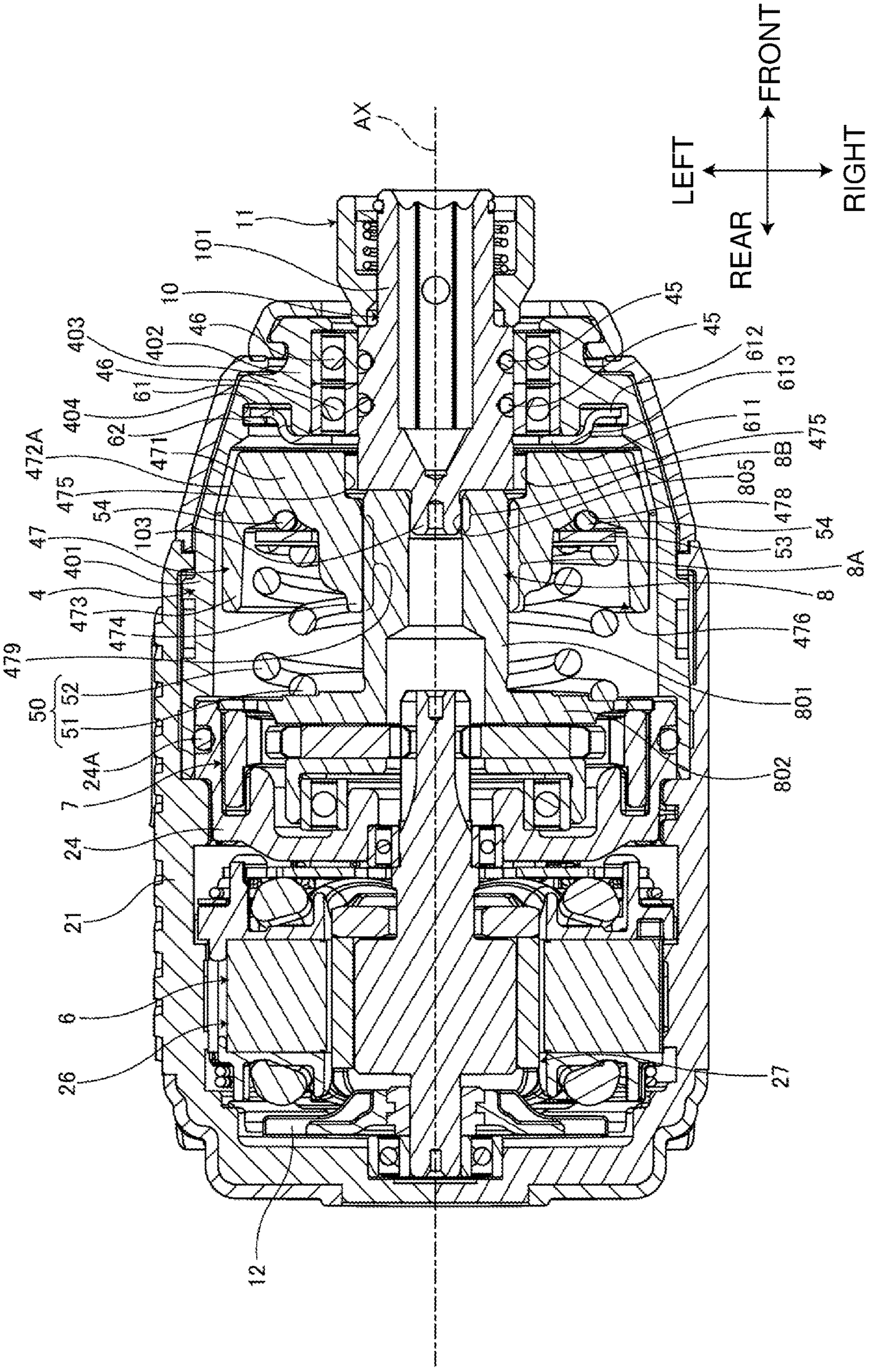
FIG. 6 is a horizontal sectional view of the upper portion of the impact tool according to the first embodiment.
Figure 7:
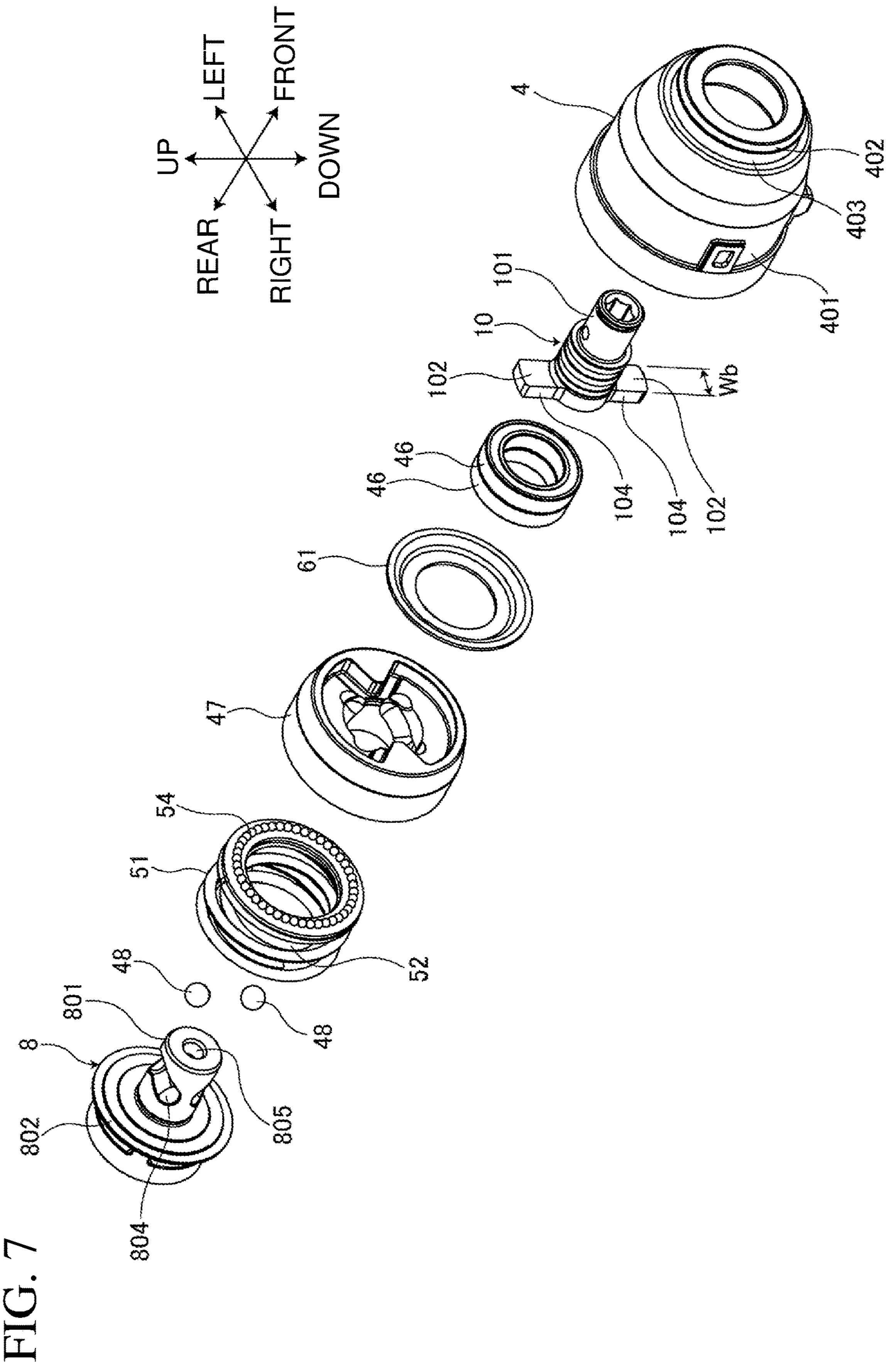
FIG. 7 is a partially exploded perspective view of the impact tool according to the first embodiment as viewed from the front.
Figure 8:
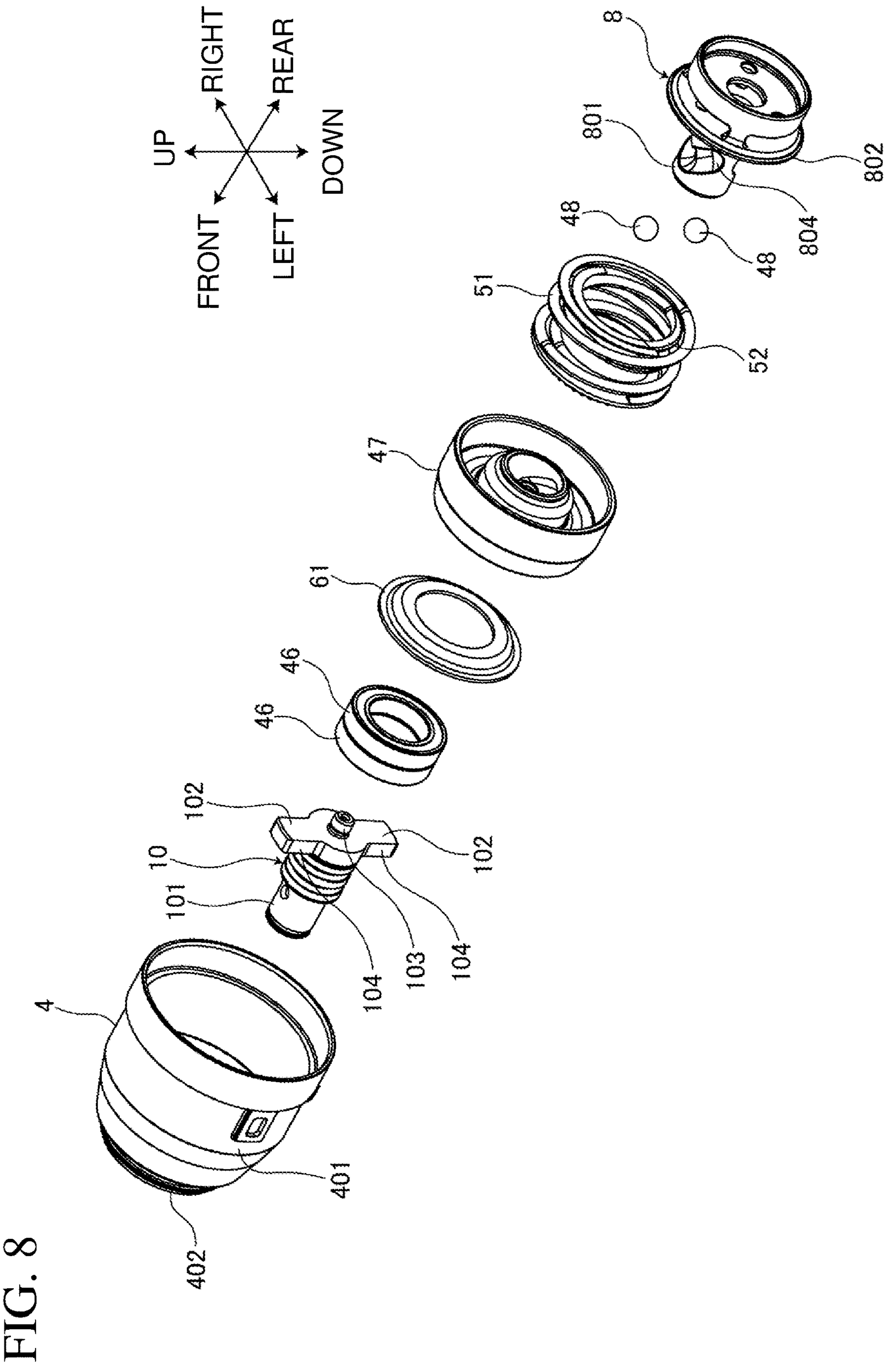
FIG. 8 is a partially exploded perspective view of the impact tool according to the first embodiment as viewed from the rear.

FIG. 5 is a longitudinal sectional view of an upper portion of the impact tool 1 according to the present embodiment. FIG. 6 is a horizontal sectional view of the upper portion of the impact tool 1. FIG. 7 is a partially exploded perspective view of the impact tool 1 as viewed from the front. FIG. 8 is a partially exploded perspective view of the impact tool 1 as viewed from the rear.

The hammer case 4 includes a first cylinder 401, a second cylinder 402, and a case connector 403. The first cylinder 401 surrounds the striker 9. The second cylinder 402 is located frontward from the first cylinder 401. The second cylinder 402 has a smaller outer diameter than the first cylinder 401. The case connector 403 connects the front end of the first cylinder 401 to the outer circumferential surface of the second cylinder 402. The second cylinder 402 has a rear end protruding rearward from the case connector 403.

The motor 6 includes the stator 26 and the rotor 27. The stator 26 includes a stator core 28, a front insulator 29, a rear insulator 30, and multiple coils 31. The rotor 27 rotates about the rotation axis AX. The rotor 27 includes a rotor core 32, a rotor shaft 33, a rotor magnet 34, and a sensor magnet 35.

The stator core 28 is located radially outward from the rotor 27. The stator core 28 includes multiple steel plates stacked on one another. The steel plates are metal plates formed from iron as a main component. The stator core 28 is cylindrical. The stator core 28 includes multiple teeth to support the coils 31.

The front insulator 29 is located on the front of the stator core 28. The rear insulator 30 is located at the rear of the stator core 28. The front insulator 29 and the rear insulator 30 are electrical insulating members formed from a synthetic resin. The front insulator 29 partially covers the surfaces of the teeth. The rear insulator 30 partially covers the surfaces of the teeth.

The coils 31 are attached to the stator core 28 with the front insulator 29 and the rear insulator 30 in between. The coils 31 surround the teeth on the stator core 28 with the front insulator 29 and the rear insulator 30 in between. The coils 31 and the stator core 28 are electrically insulated from each other with the front insulator 29 and the rear insulator 30. The coils 31 are connected to one another with fusing terminals 38.

The rotor core 32 and the rotor shaft 33 are formed from steel. The rotor shaft 33 protrudes from the end faces of the rotor core 32 in the front-rear direction. The rotor shaft 33 includes a front shaft 33F and a rear shaft 33R. The front shaft 33F protrudes frontward from the front end face of the rotor core 32. The rear shaft 33R protrudes rearward from the rear end face of the rotor core 32.

The rotor magnet 34 is fixed to the rotor core 32. The rotor magnet 34 is cylindrical. The rotor magnet 34 surrounds the rotor core 32.

The sensor magnet 35 is fixed to the rotor core 32. The sensor magnet 35 is annular. The sensor magnet 35 is located on the front end face of the rotor core 32 and the front end face of the rotor magnet 34.

A sensor board 37 is attached to the front insulator 29. The sensor board 37 is fastened to the front insulator 29 with a screw 29S. The sensor board 37 includes a circular circuit board with a hole at the center, and a rotation detector supported by the circuit board. The sensor board 37 at least partially faces the sensor magnet 35. The rotation detector detects the position of the sensor magnet 35 on the rotor 27 to detect the position of the rotor 27 in the rotation direction.

The rotor shaft 33 is rotatably supported by a rotor bearing 39. The rotor bearing 39 includes a front rotor bearing 39F and a rear rotor bearing 39R. The front rotor bearing 39F supports the front shaft 33F in a rotatable manner. The rear rotor bearing 39R supports the rear shaft 33R in a rotatable manner.

The front rotor bearing 39F is held by the bearing box 24. The bearing box 24 has a recess 241. The recess 241 is recessed frontward from the rear surface of the bearing box 24. The front rotor bearing 39F is received in the recess 241. The rear rotor bearing 39R is held on the rear plate 21B. The front end of the rotor shaft 33 is located in an internal space of the hammer case 4 through an opening in the bearing box 24.

The fan 12 is fixed to the rear of the rear shaft 33R with a bush 12A. The fan 12 is located between the rear rotor bearing 39R and the stator 26. The fan 12 rotates as the rotor 27 rotates. As the rotor shaft 33 rotates, the fan 12 rotates together with the rotor shaft 33.

A pinion gear 41 is located on the front end of the rotor shaft 33. The pinion gear 41 is connected to at least a part of the reducer 7. The rotor shaft 33 is connected to the reducer 7 with the pinion gear 41 in between.

The reducer 7 includes multiple planetary gears 42 and an internal gear 43. The multiple planetary gears 42 surround the pinion gear 41. The internal gear 43 surrounds the multiple planetary gears 42. The pinion gear 41, the planetary gears 42, and the internal gear 43 are accommodated in the hammer case 4. Each planetary gear 42 meshes with the pinion gear 41. The planetary gears 42 are rotatably supported by the spindle 8 with a pin 42P. The spindle 8 is rotated by the planetary gears 42. The internal gear 43 includes internal teeth that mesh with the planetary gears 42. The internal gear 43 is locked not to rotate relative to the bearing box 24. The internal gear 43 is constantly nonrotatable relative to the bearing box 24. The bearing box 24 is locked not to rotate relative to the left housing 2L and the right housing 2R.

When the rotor shaft 33 rotates as driven by the motor 6, the pinion gear 41 rotates, and the planetary gears 42 revolve about the pinion gear 41. The planetary gears 42 revolve while meshing with the internal teeth on the internal gear 43. The spindle 8, which is connected to the planetary gears 42 with the pin 42P in between, rotates at a lower rotational speed than the rotor shaft 33.

The spindle 8 rotates with a rotational force from the motor 6. The spindle 8 transmits the rotational force from the motor 6 to the anvil 10 through the striker 9. The spindle 8 includes a spindle shaft 801 and a flange 802. The flange 802 is located on a rear portion of the spindle shaft 801. The planetary gears 42 are rotatably supported by the flange 802 with the pin 42P. The rotation axis of the spindle 8 aligns with the rotation axis AX of the motor 6. The spindle 8 rotates about the rotation axis AX. The spindle 8 is rotatably supported by a spindle bearing 44. The spindle 8 includes a protrusion 803 on its rear end. The protrusion 803 protrudes rearward from the flange 802. The protrusion 803 surrounds the spindle bearing 44.

The bearing box 24 at least partially surrounds the spindle 8. The spindle bearing 44 is held by the bearing box 24. The bearing box 24 includes a protrusion 242. The protrusion 242 protrudes frontward from the front surface of the bearing box 24. The spindle bearing 44 surrounds the protrusion 242.

The striker 9 includes a hammer 47, hammer balls 48, a coil spring 50, and a washer 53. The striker 9 including the hammer 47, the hammer balls 48, the coil spring 50, and the washer 53 is accommodated in the first cylinder 401 in the hammer case 4. The first cylinder 401 surrounds the hammer 47.

The hammer 47 is located frontward from the reducer 7. The hammer 47 surrounds the spindle shaft 801. The hammer 47 is supported by the spindle shaft 801.

The hammer 47 is rotated by the motor 6. A rotational force from the motor 6 is transmitted to the hammer 47 through the reducer 7 and the spindle 8. The hammer 47 is rotatable together with the spindle 8 in response to a rotational force of the spindle 8 rotated by the motor 6. The rotation axis of the hammer 47 and the rotation axis of the spindle 8 align with the rotation axis AX of the motor 6. The hammer 47 rotates about the rotation axis AX.

Figure 9:
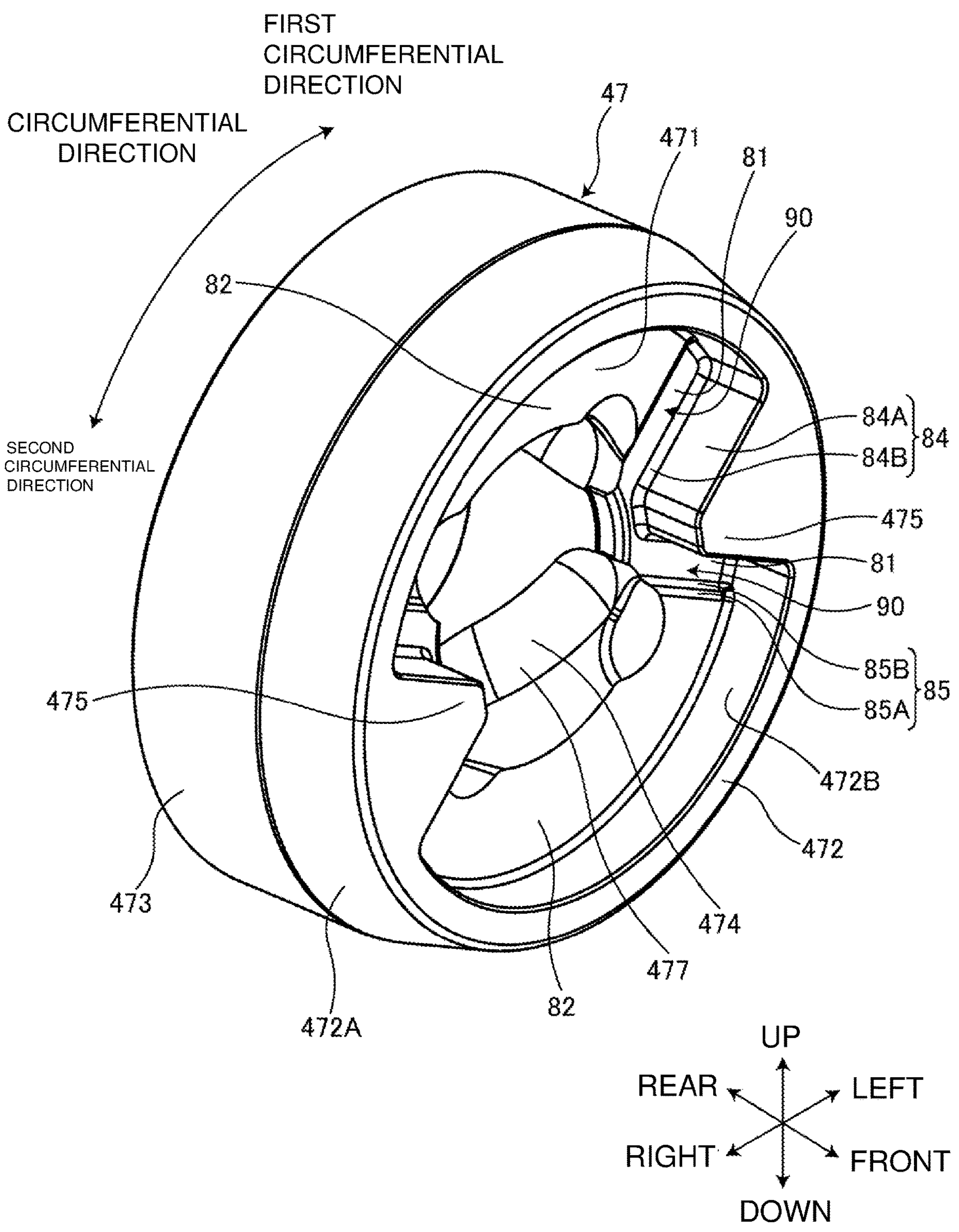
FIG. 9 is a perspective view of a hammer in the first embodiment as viewed from the front.
Figure 10:
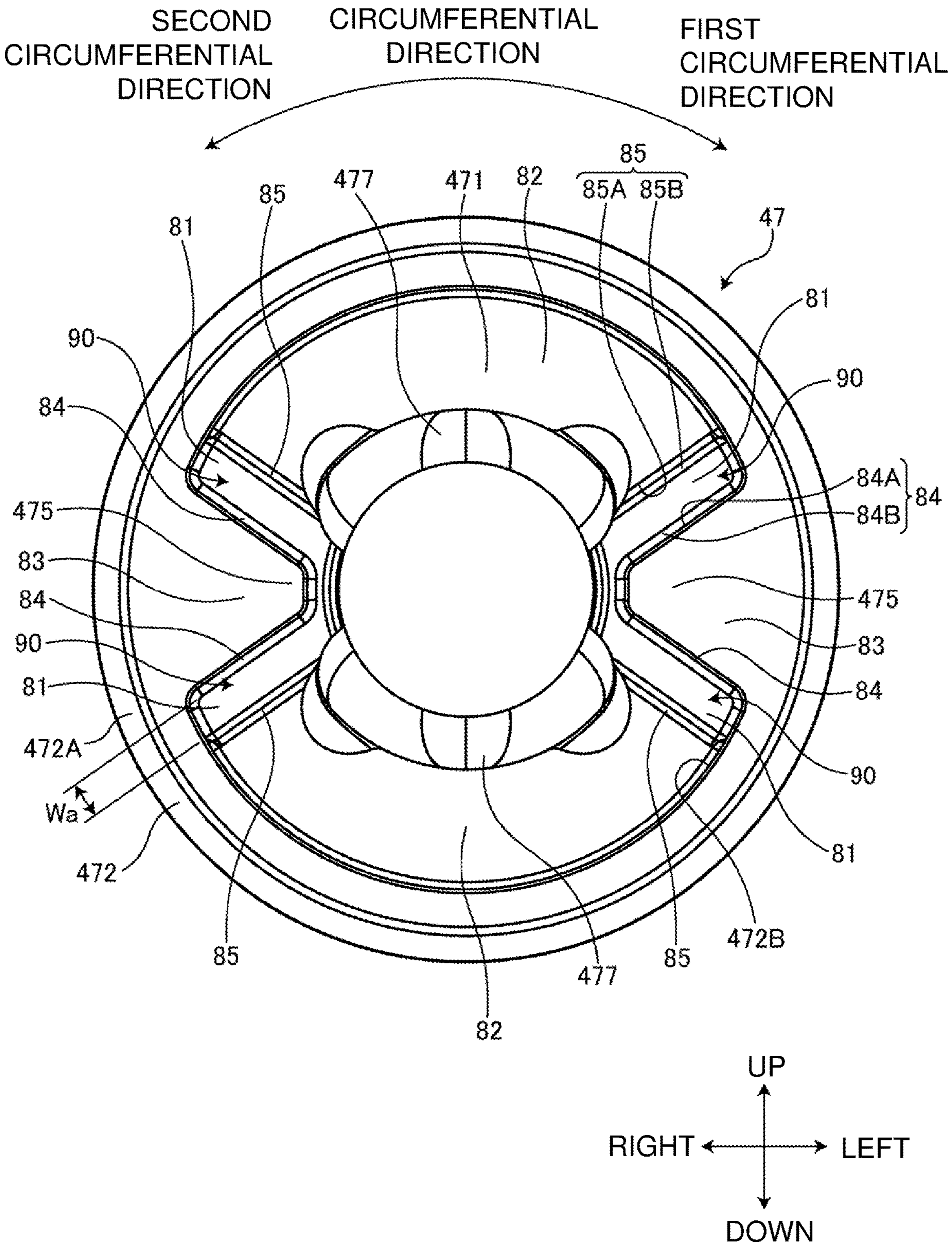
FIG. 10 is a front view of the hammer in the first embodiment.
Figure 11:
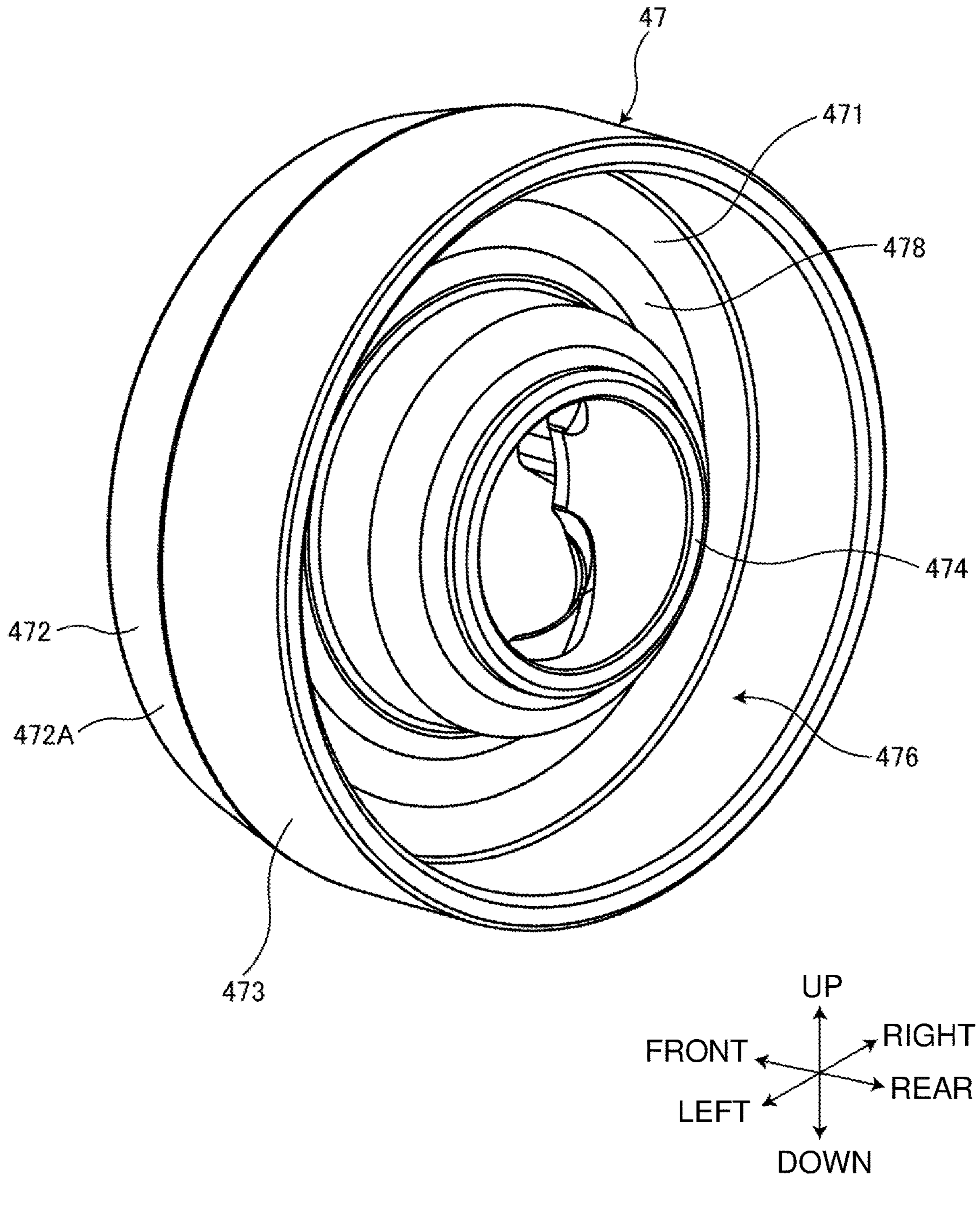
FIG. 11 is a perspective view of the hammer in the first embodiment as viewed from the rear.
Figure 12:
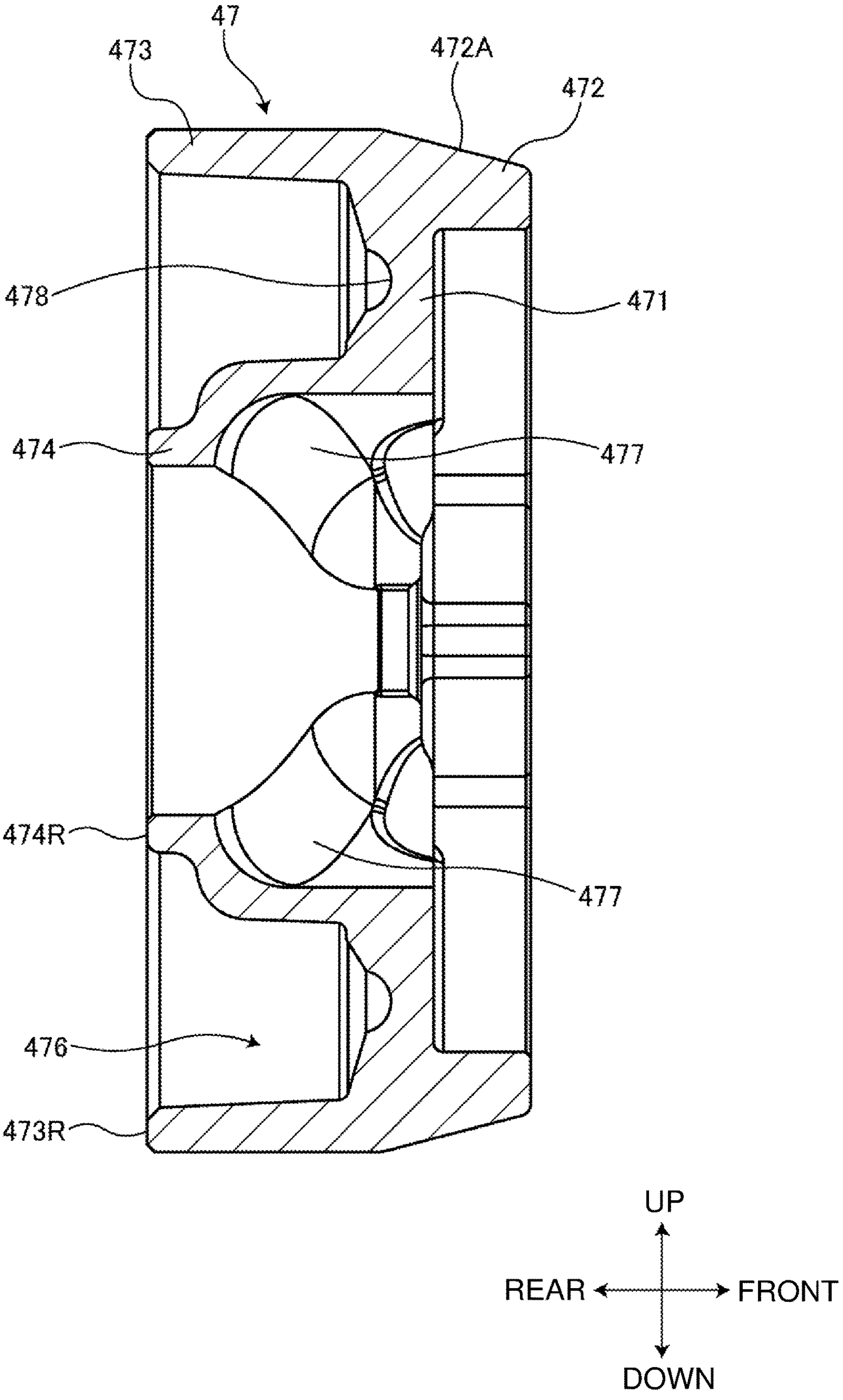
FIG. 12 is a longitudinal sectional view of the hammer in the first embodiment.
Figure 13:
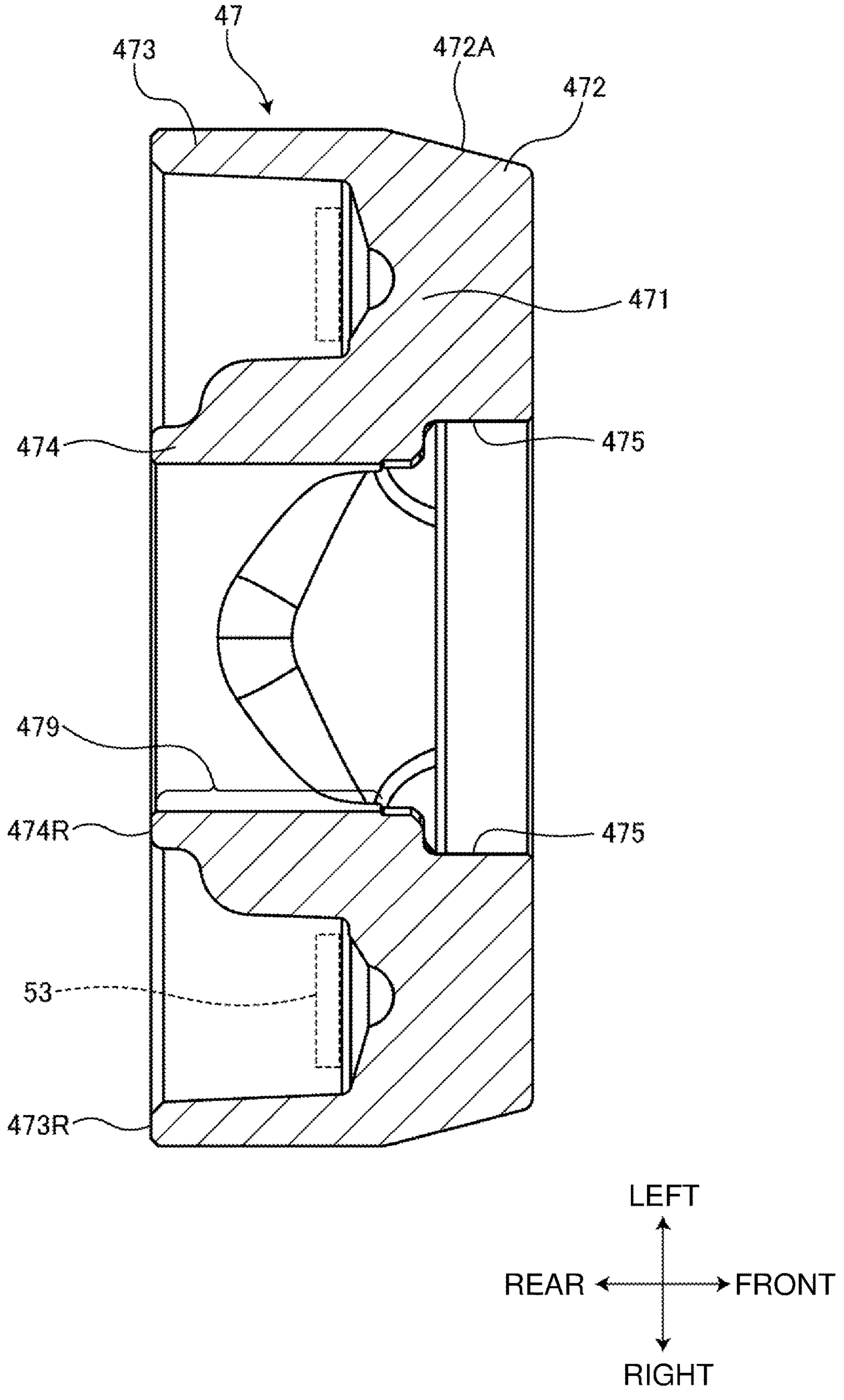
FIG. 13 is a horizontal sectional view of the hammer in the first embodiment.

FIG. 9 is a perspective view of the hammer 47 in the present embodiment as viewed from the front. FIG. 10 is a front view of the hammer 47. FIG. 11 is a perspective view of the hammer 47 as viewed from the rear. FIG. 12 is a longitudinal sectional view of the hammer 47. FIG. 13 is a horizontal sectional view of the hammer 47.

The hammer 47 includes a base 471, a front ring 472, a rear ring 473, a support ring 474, and hammer projections 475.

The base 471 surrounds the spindle shaft 801. The base 471 is annular. The spindle shaft 801 is located inward from the base 471.

The front ring 472 protrudes frontward from an outer circumference of the base 471. The front ring 472 is cylindrical. The front ring 472 has an outer circumferential surface 472A sloping frontward and radially inward.

The rear ring 473 protrudes rearward from the outer circumference of the base 471. The rear ring 473 is cylindrical.

The support ring 474 protrudes rearward from an inner circumference of the base 471. The support ring 474 is cylindrical. The support ring 474 surrounds the spindle shaft 801. The support ring 474 is supported by the spindle shaft 801 with the hammer balls 48 in between.

The hammer projections 475 protrude radially inward from the inner circumferential surface of the front ring 472. The hammer projections 475 protrude frontward from the front surface of the base 471. Each hammer projection 475 has a front surface 83 located frontward from the front surface of the base 471. The front surface of the front ring 472 and the front surfaces 83 of the hammer projections 475 are flush with one another. The hammer projections 475 are two hammer projections arranged circumferentially.

A recess 476 is defined by the rear surface of the base 471, the inner circumferential surface of the rear ring 473, and the outer circumferential surface of the support ring 474. The recess 476 is recessed frontward from the rear surface of the hammer 47.

As shown in FIGS. 12 and 13, the rear ring 473 has a rear end 473R at the same position as a rear end 474R of the support ring 474 in the front-rear direction.

The base 471 has grooves 90 at the boundaries with the hammer projections 475. The grooves 90 extend in the radial direction. The grooves 90 are located in a first circumferential direction and a second circumferential direction from the hammer projections 475.

The base 471 has a front surface including first front surfaces 81 and second front surfaces 82. The second front surfaces 82 are located at positions different from the first front surfaces 81 in the circumferential direction. The second front surfaces 82 are located frontward from the first front surfaces 81.

Each first front surface 81 has a first circumferential end connected to a second circumferential end of the corresponding front surface 83 of the hammer projection 475 with a first connecting surface 84 in between. Each second front surface 82 has a first circumferential end connected to a second circumferential end of the corresponding first front surface 81 with a second connecting surface 85 in between. The groove 90 in the second circumferential direction from the corresponding hammer projection 475 is defined by the first front surface 81, the first connecting surface 84 connected to the first circumferential end of the first front surface 81, and the second connecting surface 85 connected to the second circumferential end of the first front surface 81.

The groove 90 in the first circumferential direction from the corresponding hammer projection 475 is defined by the first front surface 81, the first connecting surface 84 connected to the second circumferential end of the first front surface 81, and the second connecting surface 85 connected to the first circumferential end of the first front surface 81.

Each first connecting surface 84 includes a first flat surface 84A and a first curved surface 84B. The first flat surface 84A is parallel to the rotation axis AX of the hammer 47. The first flat surface 84A extends in the radial direction. In the groove 90 in the second circumferential direction from the corresponding hammer projection 475, the first curved surface 84B connects the rear end of the first flat surface 84A and the first circumferential end of the first front surface 81. In the groove 90 in the first circumferential direction from the corresponding hammer projection 475, the first curved surface 84B connects the rear end of the first flat surface 84A and the second circumferential end of the first front surface 81.

Each second connecting surface 85 includes a second flat surface 85A and a second curved surface 85B. The second flat surface 85A is parallel to the rotation axis AX of the hammer 47. The second flat surface 85A extends in the radial direction. In one groove 90, the second flat surface 85A faces the first flat surface 84A. In the groove 90 in the second circumferential direction from the corresponding hammer projection 475, the second curved surface 85B connects the rear end of the second flat surface 85A and the second circumferential end of the first front surface 81. In the groove 90 in the first circumferential direction from the corresponding hammer projection 475, the second curved surface 85B connects the rear end of the second flat surface 85A and the first circumferential end of the first front surface 81.

The hammer balls 48 are formed from a metal such as steel. The hammer balls 48 are between the spindle shaft 801 and the hammer 47. The spindle 8 has spindle grooves 804. The spindle grooves 804 receive at least parts of the hammer balls 48. The spindle grooves 804 are on the outer circumferential surface of the spindle shaft 801. The hammer 47 has hammer grooves 477. The hammer grooves 477 receive at least parts of the hammer balls 48. The hammer grooves 477 are on the inner circumferential surface of the support ring 474. Each hammer ball 48 is between the spindle groove 804 and the hammer groove 477. The hammer balls 48 roll along the spindle grooves 804 and the hammer grooves 477. The hammer 47 is movable together with the hammer balls 48. The spindle 8 and the hammer 47 are movable relative to each other in the axial direction and in the rotation direction within a movable range defined by the spindle grooves 804 and the hammer grooves 477.

The coil spring 50 surrounds the spindle shaft 801. The coil spring 50 in the present embodiment includes a first coil spring 51 and a second coil spring 52 located parallel to each other. The second coil spring 52 is located radially inward from the first coil spring 51.

The first coil spring 51 and the second coil spring 52 have their rear ends supported by the flange 802. The first coil spring 51 and the second coil spring 52 have their front ends received in the recess 476. The washer 53 is received in the recess 476. The first coil spring 51 and the second coil spring 52 have their front ends supported by the washer 53. The washer 53 is annular. The first coil spring 51 and the second coil spring 52 each constantly generate an elastic force for moving the hammer 47 forward.

The washer 53 is located behind the base 471. The washer 53 supports the front end of the coil spring 50. The washer 53 is between the rear ring 473 and the support ring 474 in the radial direction. The washer 53 is received in the recess 476. The washer 53 is supported by the hammer 47 with multiple support balls 54 in between. When the hammer 47 is at the foremost position in its movable range in the front-rear direction, the washer 53 is located frontward from the rear ends of the hammer balls 48.

The support balls 54 are received in a support groove 478 on the rear surface of the base 471. The support balls 54 support the front surface of the washer 53. The support groove 478 is annular and surrounds the rotation axis AX.

The support groove 478 is at the same position as at least parts of the second front surfaces 82 in the radial direction and in the circumferential direction. The base 471 includes a thinner portion and a thicker portion. The thinner portion includes the grooves 90. The thicker portion includes no groove 90. The thinner portion includes the first front surfaces 81. The thicker portion includes the second front surfaces 82. The support groove 478 is located on the thicker portion of the base 471.

The anvil 10 includes an anvil shaft 101, anvil projections 102, and an anvil protrusion 103.

The anvil shaft 101 is located frontward from the spindle 8 and the hammer 47. The tip tool is attached to the anvil shaft 101. The tool hole 10A to receive the tip tool extends rearward from the front end of the anvil shaft 101.

As shown in FIG. 5, the tool hole 10A has a rear end 10B at the same position as at least a part of the front ring 472 in the front-rear direction. The tool hole 10A may have the rear end 10B at the same position as at least a part of the base 471. This shortens the axial length or the distance between the rear end of the rear plate 21B and the front end of the anvil 10 in the front-rear direction.

The anvil projections 102 protrude radially outward from a rear portion of the anvil shaft 101. The anvil projections 102 are struck by the hammer projections 475 in the rotation direction. The anvil projections 102 have strike surfaces 104 strikable by the hammer projections 475. The strike surfaces 104 are parallel to the rotation axis AX of the anvil 10. The first flat surfaces 84A of the hammer projections 475 at least partially face the strike surfaces 104.

The front ring 472 is located radially outward from the anvil projections 102. The front ring 472 is at the same position as at least parts of the anvil projections 102 in the axial direction. The outer periphery of each anvil projection 102 is spaced from the inner circumference of the front ring 472.

The base 471 is located rearward from the anvil projections 102. The rear surfaces of the anvil projections 102 are spaced from the front surface of the base 471.

The anvil protrusion 103 protrudes rearward from the rear end of the anvil 10. The spindle 8 is located behind the anvil 10. A spindle recess 805 is located on the front end of the spindle shaft 801. The spindle recess 805 receives the anvil protrusion 103.

As shown in FIG. 6, the outer circumferential surface of the spindle shaft 801 at least partially serves as a hammer sliding surface 8A. The support ring 474 in the hammer 47 slides on the hammer sliding surface 8A. The inner circumferential surface of the spindle recess 805 at least partially serves as an anvil sliding surface 8B. The anvil protrusion 103 on the anvil 10 slides on the anvil sliding surface 8B. The anvil sliding surface 8B is located radially inward from the hammer sliding surface 8A. The hammer sliding surface 8A and the anvil sliding surface 8B at least partially overlap each other in the front-rear direction. This shortens the axial length or the distance between the rear end of the rear plate 21B and the front end of the anvil 10 in the front-rear direction.

As shown in FIGS. 6 and 13, the inner circumferential surface of the support ring 474 in the hammer 47 at least partially serves as a sliding surface 479. The hammer sliding surface 8A of the spindle shaft 801 slides on the sliding surface 479. The sliding surface 479 has a front end located frontward from the washer 53. This structure shortens the hammer 47 in the axial direction.

The anvil 10 is rotatably supported by anvil bearings 46. The rotation axis of the anvil 10, the rotation axis of the hammer 47, and the rotation axis of the spindle 8 align with the rotation axis AX of the motor 6. The anvil 10 rotates about the rotation axis AX. The anvil bearings 46 surround the anvil shaft 101. The anvil bearings 46 are located inside the second cylinder 402 in the hammer case 4. The anvil bearings 46 are held in the second cylinder 402 in the hammer case 4. The anvil bearings 46 support a front portion of the anvil shaft 101 in a rotatable manner. O-rings 45 are located between the anvil bearings 46 and the anvil shaft 101. The O-rings 45 are in contact with the outer circumference of the anvil shaft 101 and the inner circumferences of the anvil bearings 46.

In the present embodiment, two anvil bearings 46 are arranged in the axial direction. Two O-rings 45 are arranged in the axial direction.

The hammer projections 475 can come in contact with the anvil projections 102. When the motor 6 operates, with the hammer 47 and the anvil projections 102 in contact with each other, the anvil 10 rotates together with the hammer 47 and the spindle 8.

The anvil 10 is strikable by the hammer 47 in the rotation direction. When, for example, the anvil 10 receives a higher load in a screwing operation, the anvil 10 may fail to rotate with an urging force from the coil spring 50 alone. This stops the rotation of the anvil 10 and the hammer 47. The spindle 8 and the hammer 47 are movable relative to each other in the axial direction and in the circumferential direction with the hammer balls 48 in between. When the hammer 47 stops rotating, the spindle 8 continues to rotate with power generated by the motor 6. When the hammer 47 stops rotating and the spindle 8 rotates, the hammer balls 48 move backward as being guided along the spindle grooves 804 and the hammer grooves 477. The hammer 47 receives a force from the hammer balls 48 to move backward with the hammer balls 48. In other words, the hammer 47 moves backward when the anvil 10 stops rotating and the spindle 8 rotates. Thus, the hammer 47 and the anvil projections 102 are out of contact from each other.

The coil spring 50 constantly generates an elastic force for moving the hammer 47 forward. The hammer 47 that has moved backward then moves forward under an elastic force from the coil spring 50. When moving forward, the hammer 47 receives a force in the rotation direction from the hammer balls 48. In other words, the hammer 47 moves forward while rotating. The hammer projections 475 then come in contact with the anvil projections 102 while rotating. Thus, the anvil projections 102 are struck by the hammer projections 475 in the rotation direction. The anvil 10 receives power from the motor 6 and an inertial force from the hammer 47. The anvil 10 thus rotates with high torque about the rotation axis AX.

The tool holder 11 includes balls 71, a sleeve 73, and coil springs 74.

The anvil shaft 101 has support recesses 76 for supporting the balls 71. The support recesses 76 are located on the outer surface of the anvil shaft 101. In the present embodiment, the anvil shaft 101 has two support recesses 76.

The balls 71 are supported on the anvil 10 in a movable manner. The balls 71 are received in the support recesses 76. One ball 71 is received in one support recess 76.

The anvil shaft 101 has a through-hole connecting the inner surfaces of the support recesses 76 and the inner surface of the tool hole 10A. Each ball 71 has a smaller diameter than the through-hole. The balls 71 supported in the support recesses 76 are received at least partially in the tool hole 10A. The balls 71 fasten the tip tool received in the tool hole 10A.

The balls 71 are movable between an engagement position and a release position. At the engagement position, the balls 71 fasten the tip tool. At the release position, the balls 71 unfasten the tip tool.

The sleeve 73 is cylindrical. The sleeve 73 surrounds the anvil shaft 101. The sleeve 73 is movable between a movement-restricting position and a movement-permitting position around the anvil shaft 101. At the movement-restricting position, the sleeve 73 restricts radially outward movement of the balls 71. At the movement-permitting position, the sleeve 73 permits radially outward movement of the balls 71.

The sleeve 73 at the movement-restricting position restricts the balls 71 from moving radially outward. Thus, the tip tool remains fastened by the balls 71.

The sleeve 73 moves to the movement-permitting position to permit the balls 71 to move radially outward. This causes the tip tool fastened by the balls 71 to be unfastened.

The coil springs 74 generate an elastic force for moving the sleeve 73 to the movement-restricting position. The coil springs 74 surround the anvil shaft 101. The movement-restricting position is defined rearward from the movement-permitting position. The coil springs 74 generate an elastic force for moving the sleeve 73 backward.

The impact tool 1 according to the present embodiment includes a cup washer 61 to prevent contact between the anvil projections 102 and the hammer case 4. The cup washer 61 in the present embodiment prevents contact between the front surfaces of the anvil projections 102 and the rear end of the second cylinder 402. The second cylinder 402 receives a load from the anvil projections 102 through the cup washer 61.

The cup washer 61 is supported on the hammer case 4. The cup washer 61 in the present embodiment has its outer circumference in a groove portion 404 on the inner circumferential surface of the first cylinder 401. The impact tool 1 includes a stopper 62. The stopper 62 reduces the slipping of the cup washer 61 rearward from the groove portion 404.

Figure 14:
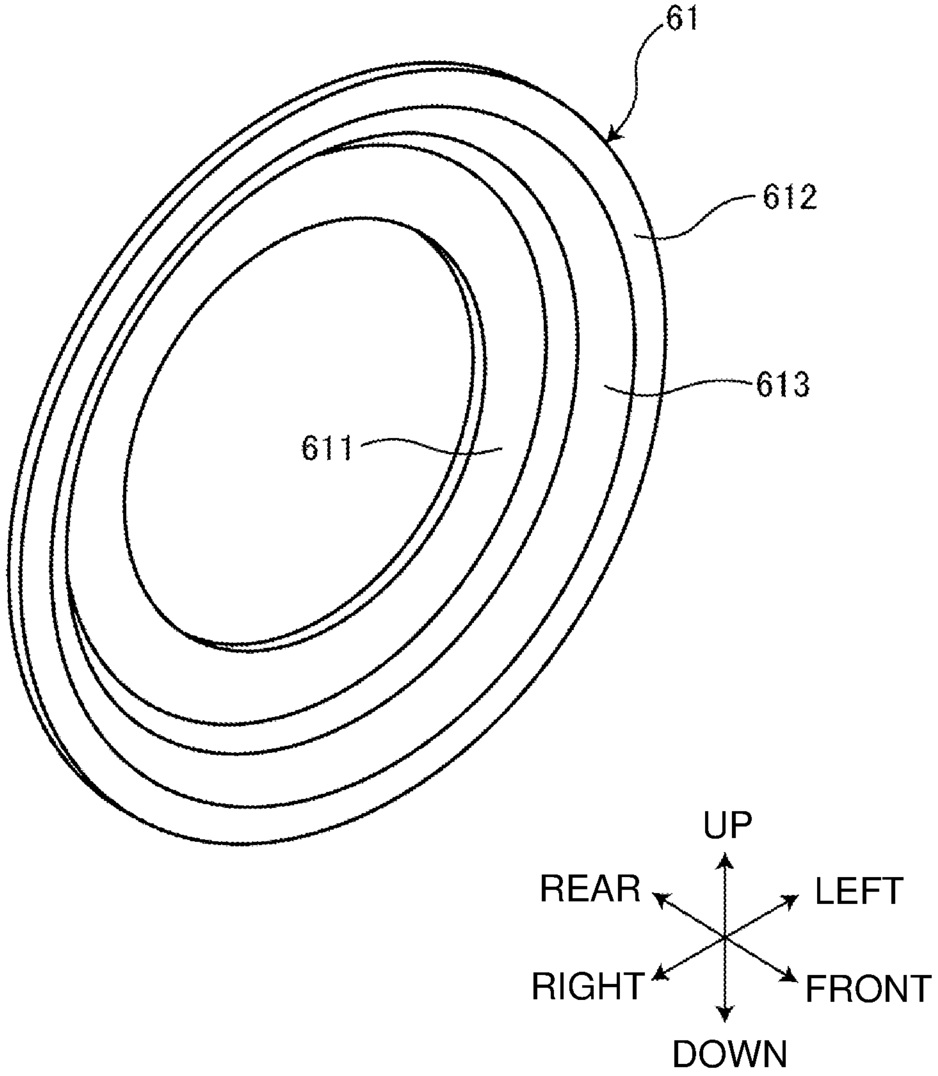
FIG. 14 is a perspective view of a cup washer in the first embodiment as viewed from the front.

FIG. 14 is a perspective view of the cup washer 61 in the present embodiment as viewed from the front. The cup washer 61 includes an inner ring portion 611, an outer ring portion 612, and a connecting ring portion 613.

The inner ring portion 611 faces the front surfaces of the anvil projections 102. The inner ring portion 611 is in contact with the rear end faces of the anvil bearings 46.

The outer ring portion 612 surrounds the anvil bearings 46. The outer ring portion 612 is located radially outward and frontward from the inner ring portion 611. The outer ring portion 612 is at the same position as at least parts of the anvil bearings 46 in the axial (front-rear) direction. The outer ring portion 612 is supported on the hammer case 4. The outer ring portion 612 is received in the groove portion 404 on the inner circumferential surface of the first cylinder 401.

The rear surface of the case connector 403 at least partially faces the front surface of the outer ring portion 612. The rear surface of the case connector 403 faces the front surface of the outer ring portion 612 across a space.

The connecting ring portion 613 connects an outer edge of the inner ring portion 611 and an inner edge of the outer ring portion 612.

The anvil bearings 46 in the present embodiment are ball bearings. The anvil bearings 46 each include an inner ring, balls, and an outer ring. The inner rings in the anvil bearings 46 are in contact with the O-rings 45. The balls are between the inner rings and the outer rings in the radial direction. The balls are in contact with the inner rings and the outer rings. Multiple balls are arranged circumferentially. The outer rings are located radially outward from the inner rings and the balls. The outer rings in the anvil bearings 46 are in contact with the inner circumferential surface of the second cylinder 402.

The inner ring portion 611 in the present embodiment is in contact with the rear end faces of the outer rings in the anvil bearings 46. The inner ring portion 611 is not in contact with the inner rings in the anvil bearings 46.

The stopper 62 engages with each of the hammer case 4 and the cup washer 61. The stopper 62 is supported on the hammer case 4. The stopper 62 is received in the groove portion 404. The stopper 62 reduces the slipping of the cup washer 61 rearward. The stopper 62 is, for example, a snap ring or a C-ring. The stopper 62 is received in the groove portion 404 to be in contact with the rear surface of the outer ring portion 612. The outer ring portion 612 is supported on the hammer case 4 with the stopper 62 in between.

The cup washer 61 and the stopper 62 reduce the slipping of the anvil bearings 46 rearward.

Effects of Hammer

Figure 15:
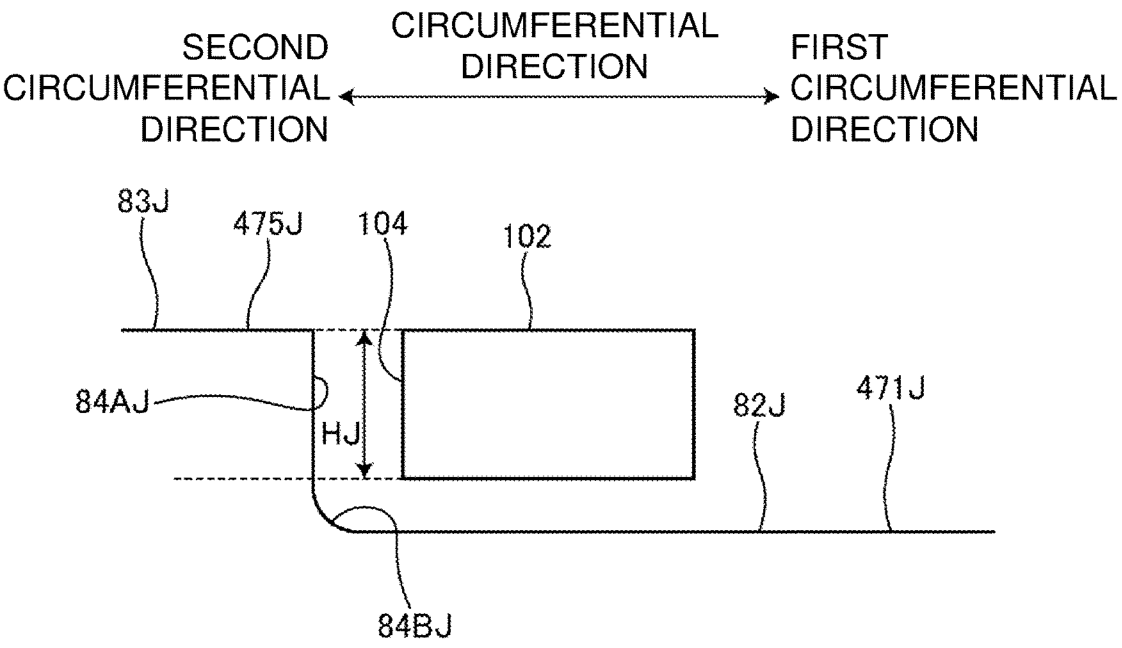
FIG. 15 is a schematic diagram describing the relationship between an anvil and a hammer in a comparative example.

FIG. 15 is a schematic diagram describing the relationship between an anvil and a hammer in a comparative example.

Figure 16:
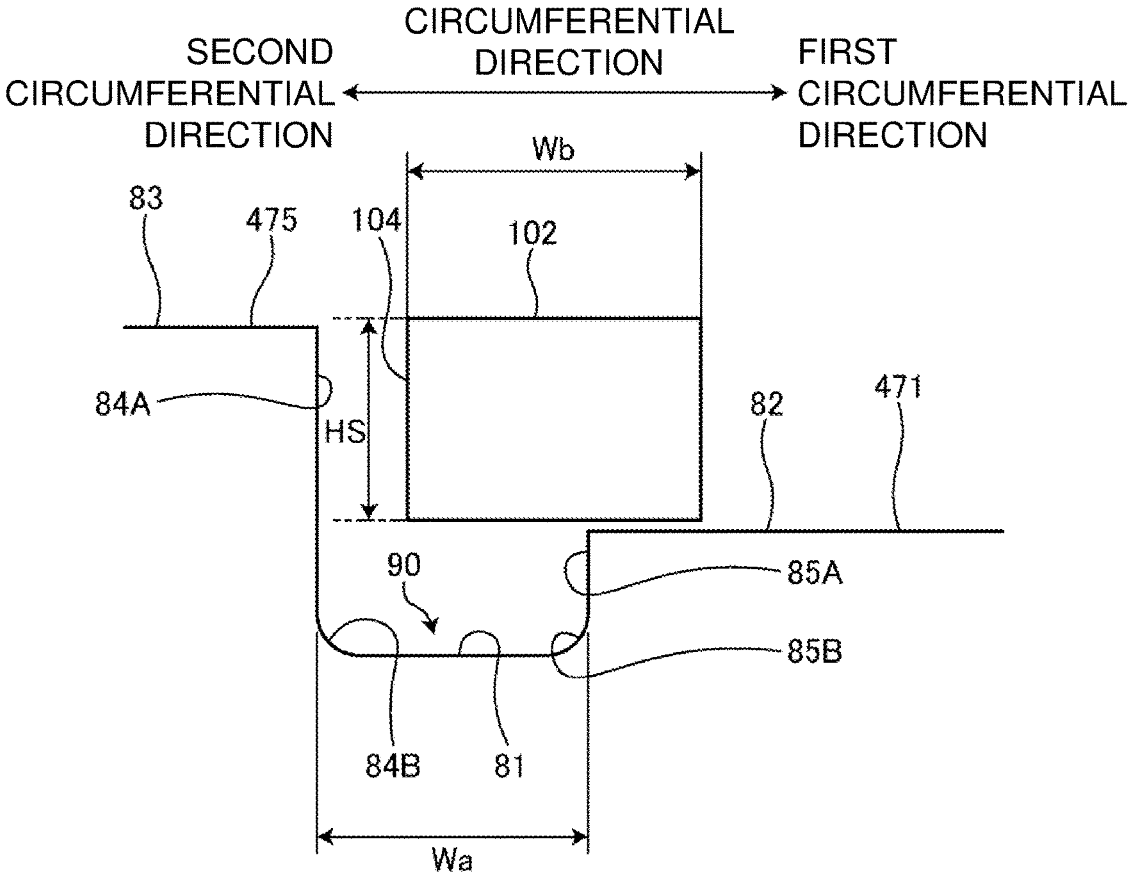
FIG. 16 is a schematic diagram describing the relationship between an anvil and the hammer in the first embodiment.

FIG. 16 is a schematic diagram describing the relationship between the anvil 10 and the hammer 47 in the present embodiment.

As shown in FIG. 16, the anvil projections 102 are struck by the hammer projections 475 as the hammer 47 rotates. In the present embodiment, the base 471 has the grooves 90 adjacent to the hammer projections 475. In this structure, a contact area HS between each hammer projection 475 and the corresponding anvil projection 102 is less likely to be smaller. The impact tool 1 has less size increase in the axial direction. The contact area HS between the hammer projection 475 and the anvil projection 102 is less likely to be smaller. The hammer projection 475 is thus less likely to receive an excess force. This reduces wear of the hammer projections 475. The hammer 47 is less likely to have a shorter service life.

When a base 471J has no groove as shown in FIG. 15, a contact area HJ between a hammer projection 475J and an anvil projection 102 is smaller. In the example shown in FIG. the base 471J has a front surface 82J connected to a front surface 83J of the hammer projection 475J with a flat surface 84AJ and a curved surface 84BJ in between. The curved surface 84BJ reduces stress concentration at the hammer projection 475J. To be struck by the hammer projection 475J appropriately, the strike surface 104 of the anvil projection 102 is to be in contact with the flat surface 84AJ and is not to be in contact with the curved surface 84BJ. Thus, the contact area HJ between the flat surface 84AJ and the strike surface 104 is smaller. The contact area HJ can be increased by increasing the axial dimensions of the hammer projection 475J and the anvil projection 102. However, this increases the size of the impact tool in the axial direction. Any larger impact tool can have lower operability.

As shown in FIG. 16, the base 471 in the present embodiment has the grooves 90. In this structure, the contact area HS between the hammer projection 475 and the anvil projection 102 is less likely to be smaller, without an increase in the axial dimension of the hammer projection 475. In the present embodiment, the second front surface 82 of the base 471 is connected to the front surface 83 of the hammer projection 475 with the groove 90 in between. The groove 90 is defined by the first front surface 81, the first flat surface 84A, the first curved surface 84B, the second flat surface 85A, and the second curved surface 85B. The first curved surface 84B reduces stress concentration at the hammer projection 475. To be struck by the hammer projection 475 appropriately, the strike surface 104 of the anvil projection 102 is to be in contact with the first flat surface 84A and is not to be in contact with the first curved surface 84B. The groove 90 expands the first flat surface 84A rearward. In this structure, the contact area HS between the first flat surface 84A and the strike surface 104 is less likely to be smaller. With the contact area HS between the hammer projection 475 and the anvil projection 102 less likely to be smaller, the impact tool 1 has less size increase in the axial direction.

As shown in FIGS. 7, 10, and 16, the first flat surface 84A and the second flat surface have a distance Wa between them being smaller than the dimension of the anvil projection 102 in the circumferential direction in the present embodiment. The distance Wa corresponds to the width of the groove 90. The first curved surface 84B and the second curved surface 85B each have an arc-shaped cross section. The distance Wa between the first flat surface 84A and the second flat surface 85A is larger than the sum of the radius of the first curved surface 84B and the radius of the second curved surface 85B.

Operation of Impact Tool

The operation of the impact tool 1 will now be described. To perform, for example, a screwing operation on a workpiece, a tip tool (screwdriver bit) for the screwing operation is placed into the tool hole 10A in the anvil 10. The tip tool in the tool hole 10A is held by the tool holder 11. The operator then, for example, holds the grip 22 with the right hand and pulls the trigger lever 14 with the right index finger. Power is then supplied from the battery pack 25 to the motor 6 to activate the motor 6 and turn on the light 17 at the same time. In response to the activation of the motor 6, the rotor shaft 33 in the rotor 27 rotates. A rotational force of the rotor shaft 33 is then transmitted to the planetary gears 42 through the pinion gear 41. The planetary gears 42 revolve about the pinion gear 41 while rotating and meshing with the internal teeth on the internal gear 43. The planetary gears 42 are rotatably supported by the spindle 8 with the pin 42P. The revolving planetary gears 42 rotate the spindle 8 at a lower rotational speed than the rotor shaft 33.

When the spindle 8 rotates, with the hammer projections 475 and the anvil projections 102 in contact with each other, the anvil 10 rotates together with the hammer 47 and the spindle 8. The screwing operation proceeds in this manner.

When the anvil 10 receives a predetermined or higher load as the screwing operation proceeds, the anvil 10 and the hammer 47 stop rotating. When the spindle 8 rotates in this state, the hammer 47 moves backward. Thus, the hammer projections 475 and the anvil projections 102 are out of contact from each other. The hammer 47 that has moved backward then moves forward while rotating under elastic forces from the first coil spring 51 and the second coil spring 52. Thus, the anvil projections 102 are struck by the hammer projections 475 in the rotation direction. The anvil 10 rotates about the rotation axis AX with high torque. The screw is thus fastened to the workpiece under high torque.

As described above, the impact tool 1 according to the present embodiment may include the motor 6, the spindle 8 rotatable with the rotational force from the motor 6, the anvil located frontward from the spindle 8, and the hammer 47. The spindle 8 may include the spindle shaft 801, and the flange 802 on the rear portion of the spindle shaft 801. The anvil 10 may include the anvil shaft 101 to receive the tip tool, and the anvil projections 102 protruding radially outward from the anvil shaft 101. The hammer 47 may include the base 471 surrounding the spindle shaft 801, the front ring 472 protruding frontward from the outer circumference of the base 471, and the hammer projections 475 protruding radially inward from the inner circumferential surface of the front ring 472 to strike the anvil projections 102 in the rotation direction. Each hammer projection 475 may have the front surface 83 located frontward from the front surface of the base 471. The base 471 may have the grooves 90 at the boundaries with the hammer projections 475.

In the above structure including the base 471 with the grooves 90, the contact area between the hammer projection 475 and the anvil projection 102 is less likely to be smaller. The impact tool 1 has less size increase in the axial direction parallel to the rotation axis AX of the motor 6. The contact area between the hammer projection 475 and the anvil projection 102 is less likely to be smaller. The hammer projection 475 is thus less likely to receive an excess force. This reduces wear of the hammer projections 475. The hammer 47 is less likely to have a shorter service life.

The base 471 in the present embodiment may have the first front surfaces 81 and the second front surfaces 82 at positions different from the first front surfaces 81 in the circumferential direction and frontward from the first front surfaces 81. Each first front surface 81 may have the first circumferential end connected to the second circumferential end of the front surface 83 of the hammer projection 475 with the first connecting surface 84 in between. Each second front surface 82 may have the first circumferential end connected to the second circumferential end of the first front surface 81 with the second connecting surface 85 in between. Each first connecting surface 84 may have the first flat surface 84A parallel to the rotation axis AX of the hammer 47 and at least partially facing the strike surface 104 of the corresponding anvil projection 102, and the first curved surface 84B connecting the rear end of the first flat surface 84A and the first circumferential end of the first front surface 81. Each groove 90 may be defined by the first front surface 81, the first connecting surface 84, and the second connecting surface 85.

The first flat surface 84A is connected to the first front surface 81 with the first curved surface 84B in between, thus reducing stress concentration at the boundary between the first flat surface 84A and the first front surface 81. This reduces, for example, cracks in the hammer 47.

In the present embodiment, the front ring 472 may have the outer circumferential surface 472A sloping frontward and radially inward.

The hammer 47 thus has less size increase in the radial direction. Thus, the hammer case 4 has also less size increase in its front portion in the radial direction.

The front ring 472 in the present embodiment may be located radially outward from the anvil projections 102. The front ring 472 may be at the same position as at least parts of the anvil projections 102 in the axial direction.

This increases the moment of inertia from the hammer 47 when the hammer projections 475 strike the anvil projections 102, thus increasing a striking force.

In the present embodiment, each second connecting surface 85 may have the second flat surface 85A parallel to the rotation axis AX of the hammer 47 and facing the first flat surface 84A, and the second curved surface 85B connecting the rear end of the second flat surface 85A and the second circumferential end of the first front surface 81. The distance Wa between the first flat surface 84A and the second flat surface 85A may be smaller than a circumferential dimension Wb of the anvil projection 102.

The second flat surface 85A is connected to the first front surface 81 with the second curved surface 85B in between, thus reducing stress concentration at the boundary between the second flat surface 85A and the first front surface 81. This reduces, for example, cracks in the hammer 47. The distance Wa between the first flat surface 84A and the second flat surface 85A, which corresponds to the width of the groove 90, is smaller than the dimension Wb of the anvil projection 102 in the circumferential direction. The anvil projection 102 thus rotates smoothly without fitting into the groove 90.

In the present embodiment, the distance Wa between the first flat surface 84A and the second flat surface 85A may be larger than the sum of the radius of the first curved surface 84B and the radius of the second curved surface 85B.

The first curved surface 84B and the second curved surface 85B are located in the groove 90. For example, when the first curved surface 84B and the second curved surface 85B each have a radius of 0.5 mm, the groove 90 may have a width of about 4 mm.

The impact tool 1 according to the present embodiment may include the coil spring surrounding the spindle shaft 801, the washer 53 located behind the base 471 and supporting the front end of the coil spring 50, and the support balls 54 received in the support groove 478 on the rear surface of the base 471 and supporting the front surface of the washer 53. The support groove 478 may be at the same position as at least a part of the second front surface 82 in the radial direction and in the circumferential direction.

The hammer 47 with this structure can be smaller.

The hammer 47 in the present embodiment may include the rear ring 473 protruding rearward from the outer circumference of the base 471.

This increases the moment of inertia from the hammer 47 when the hammer projections 475 strike the anvil projections 102, thus increasing a striking force.

The hammer 47 in the present embodiment may include the support ring 474 protruding rearward from the inner circumference of the base 471 and supported by the spindle shaft 801 with the hammer balls 48 in between. The washer 53 may be between the rear ring 473 and the support ring 474 in the radial direction.

The front end of the coil spring 50 is received between the rear ring 473 and the support ring 474. The impact tool 1 thus has less size increase in the axial direction parallel to the rotation axis AX of the motor 6.

The washer 53 in the present embodiment may be located frontward from the rear ends of the hammer balls 48.

The impact tool 1 thus has less size increase in the axial direction parallel to the rotation axis AX of the motor 6.

Second Embodiment

A second embodiment will now be described. The same or corresponding components as those in the above embodiment are given the same reference numerals, and will be described briefly or will not be described.

Figure 17:
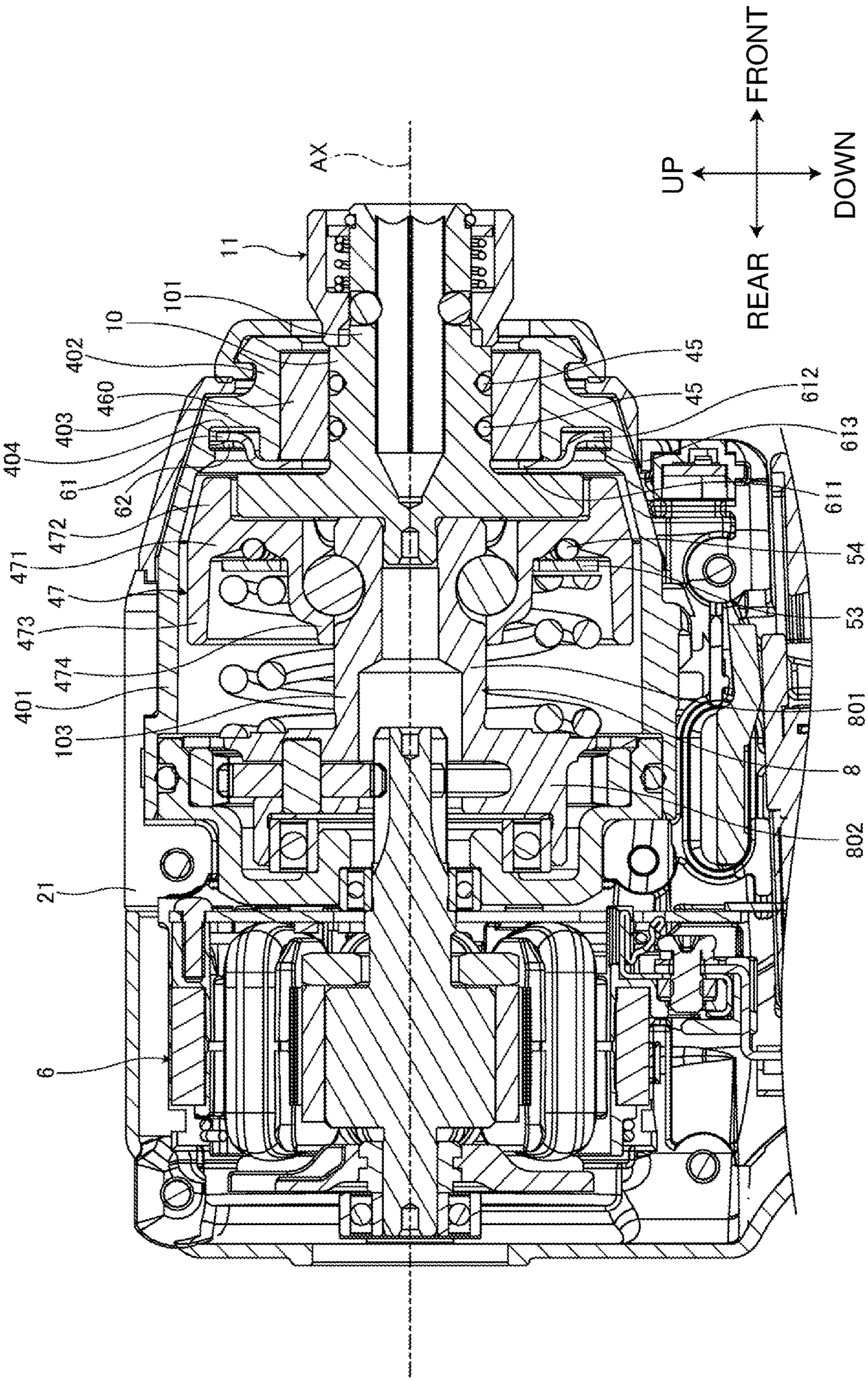
FIG. 17 is a longitudinal sectional view of an upper portion of an impact tool according to a second embodiment.

FIG. 17 is a longitudinal sectional view of the upper portion of an impact tool 1 according to the present embodiment. In the present embodiment, an anvil bearing 460 supporting the anvil shaft 101 in a rotatable manner is a slide bearing. The inner ring portion 611 in the cup washer 61 is in contact with the rear end face of the anvil bearing 460.

The anvil bearing 460 surrounds the anvil shaft 101. Two O-rings 45 are located between the anvil shaft 101 and the anvil bearing 460. The O-rings 45 are located radially inward from the anvil bearing 460. The O-rings 45 improve the sealing at the boundary between the anvil bearing 460 and the anvil shaft 101. The O-rings 45 also reduce vibrations transmitted from the anvil shaft 101 to the anvil bearing 460.

Other Embodiments

In the above embodiments, the impact tool 1 is an impact driver. The impact tool 1 may be an impact wrench.

In the above embodiments, the impact tool 1 may use utility power (alternating current power supply) instead of the battery pack 25.

REFERENCE SIGNS LIST

1 impact tool
2 housing
2L left housing
2R right housing
2S screw

4 hammer case
5A hammer case cover
5B bumper
5C housing cover
6 motor
7 reducer
8 spindle
8A hammer sliding surface
8B anvil sliding surface
9 striker
10 anvil
10A tool hole
10B rear end
11 tool holder
12 fan
12A bush
13 battery mount
14 trigger lever
15 forward-reverse switch lever
16 operation display
16A operation button
17 light
18 controller
19 inlet
20 outlet
21 motor compartment
21A cylindrical portion
21B rear plate
22 grip
23 battery holder
24 bearing box
24A O-ring
25 battery pack
26 stator
27 rotor
28 stator core
29 front insulator
29S screw
30 rear insulator
31 coil
32 rotor core
33 rotor shaft
33F front shaft
33R rear shaft
34 rotor magnet
35 sensor magnet
37 sensor board
38 fusing terminal
39 rotor bearing
39F front rotor bearing
39R rear rotor bearing
41 pinion gear
42 planetary gear
42P pin
43 internal gear
44 spindle bearing
45 O-ring
46 anvil bearing
47 hammer
48 hammer ball
50 coil spring
51 first coil spring
52 second coil spring
53 washer
54 support ball
61 cup washer
62 stopper
71 ball
73 sleeve
74 coil spring
76 support recess
81 first front surface
82 second front surface
83 front surface
84 first connecting surface
84A first flat surface
84B first curved surface
85 second connecting surface
85A second flat surface
85B second curved surface
90 groove
101 anvil shaft
102 anvil projection
103 anvil protrusion
104 strike surface
241 recess
242 protrusion
401 first cylinder
402 second cylinder
403 case connector
404 groove portion
460 anvil bearing
471 base
472 front ring
472A outer circumferential surface
473 rear ring
473R rear end
474 support ring
474R rear end
475 hammer projection
476 recess
477 hammer groove
478 support groove
479 sliding surface
611 inner ring portion
612 outer ring portion
613 connecting ring portion
801 spindle shaft
802 flange
803 protrusion
804 spindle groove
805 spindle recess
AX rotation axis

What is claimed is:

1. An impact tool, comprising:
a motor;
a spindle rotatable with a rotational force from the motor, the spindle including
a spindle shaft, and
a flange on a rear portion of the spindle shaft;
an anvil located frontward from the spindle, the anvil including
an anvil shaft to receive a tip tool, and
an anvil projection protruding radially outward from the anvil shaft; and
a hammer including
a base surrounding the spindle shaft, the base including a thinner portion and a thicker portion,
a front ring protruding frontward from an outer circumference of the base, and
a hammer projection protruding radially inward from an inner circumferential surface of the front ring to strike the anvil projection in a rotation direction, the hammer projection having a front surface located frontward from a front surface of the base, wherein the thinner portion has a groove at a boundary with the hammer projection, wherein the thinner portion has a first front surface, the thicker portion has a second front surface, and the second front surface is at a position different from the first front surface in a circumferential direction and frontward from the first front surface.

2. The impact tool according to claim 1, wherein the first front surface has a first circumferential end connected to a second circumferential end of the front surface of the hammer projection with a first connecting surface in between, the second front surface has a first circumferential end connected to a second circumferential end of the first front surface with a second connecting surface in between, the first connecting surface has a first flat surface parallel to a rotation axis of the hammer and at least partially facing a strike surface of the anvil projection, and a first curved surface connecting a rear end of the first flat surface and the first circumferential end of the first front surface, and the groove is defined by the first front surface, the first connecting surface, and the second connecting surface.

3. The impact tool according to claim 2, wherein the second connecting surface has a second flat surface parallel to the rotation axis of the hammer and facing the first flat surface, and a second curved surface connecting a rear end of the second flat surface and the second circumferential end of the first front surface, and a distance between the first flat surface and the second flat surface is smaller than a circumferential dimension of the anvil projection.

4. The impact tool according to claim 3, wherein the distance between the first flat surface and the second flat surface is larger than a sum of a radius of the first curved surface and a radius of the second curved surface.

5. The impact tool according to claim 2, further comprising:

a coil spring surrounding the spindle shaft;

a washer located behind the base and supporting a front end of the coil spring; and a support ball received in a support groove on a rear surface of the base and supporting a front surface of the washer, wherein the support groove is at the same position as at least a part of the second front surface in a radial direction and in the circumferential direction.

6. The impact tool according to claim 5, wherein the hammer includes a rear ring protruding rearward from the outer circumference of the base.

7. The impact tool according to claim 6, wherein the hammer includes a support ring protruding rearward from an inner circumference of the base and supported by the spindle shaft with a hammer ball in between, and the washer is between the rear ring and the support ring in the radial direction.

8. The impact tool according to claim 7, wherein the washer is located frontward from a rear end of the hammer ball.

9. The impact tool according to claim 2, wherein the front ring has an outer circumferential surface sloping frontward and radially inward.

10. The impact tool according to claim 2, wherein the front ring is located radially outward from the anvil projection, and the front ring is at the same position as at least a part of the anvil projection in an axial direction.

11. The impact tool according to claim 1, wherein the front ring has an outer circumferential surface sloping frontward and radially inward.

12. The impact tool according to claim 11, wherein the front ring is located radially outward from the anvil projection, and the front ring is at the same position as at least a part of the anvil projection in an axial direction.

13. The impact tool according to claim 1, wherein the front ring is located radially outward from the anvil projection, and the front ring is at the same position as at least a part of the anvil projection in an axial direction.

14. The impact tool according to claim 1, wherein the front ring has an annular cylindrical shape, and the front ring protrudes frontward from an entire outer circumference of the base.

* * * * *